(12) United States Patent
Koenemann

(10) Patent No.: US 7,398,696 B2
(45) Date of Patent: Jul. 15, 2008

(54) METHOD AND DEVICE FOR DETERMINING DEFORMATIONS

(76) Inventor: Falk H. Koenemann, Im Johannistal 19, 52064 Aachen (DE)

( * ) Notice: Subject to any disclaimer, the term of this patent is extended or adjusted under 35 U.S.C. 154(b) by 0 days.

(21) Appl. No.: 10/509,559

(22) PCT Filed: Mar. 26, 2003

(86) PCT No.: PCT/DE03/01002

§ 371 (c)(1),
(2), (4) Date: May 27, 2005

(87) PCT Pub. No.: WO03/081484

PCT Pub. Date: Oct. 2, 2003

(65) Prior Publication Data

US 2005/0235756 A1 Oct. 27, 2005

(30) Foreign Application Priority Data

Mar. 26, 2002 (DE) .................... 102 13 728

(51) Int. Cl.
*G01N 33/24* (2006.01)
(52) U.S. Cl. .................................. 73/784; 703/2
(58) Field of Classification Search .......... 73/760, 73/784; 703/2
See application file for complete search history.

(56) References Cited

OTHER PUBLICATIONS

"Zur Mechanik Geologischer Brucherscheinungen", Riedel, Centralblatt fuer Mineralogie, Abt.B, 1929, pp. 354-368.

"Orthogneiss, Mylonite and Non Coaxial Deformation of Granites: The Example of the South Armorican Shear Zone", Berthé et al., Journal of Structural Geology, vol. 1, No. 1, 1979, pp. 31-42.

"Buckling of Strike-Slip Faults—In a Model and in Nature", Merzer et al., Geophys. J.R. Soc. 43, 1975, pp. 517-530.

"Reduction of Mantle and Core Properties to a Standard State by Adiabatic Decompression", Jeanloz et al., Saxena, S. (ed.) Chemistry and Physics of Terrestrial Planets, 1986, pp. 275-309.

"Deformation of Polycrystalline Salt in Compression and in Shear at 250-350° C.", Franssen et al., Knipe, R.J. & Rutter, E.H. (eds), Deformation Mechanisms, Rheology and Tectonics, Geological Society Special Publication No. 45, 1990, pp. 201-213.

"The Structure of the Spessart Mts. Crystalline Basement and its Position in the Frame of the Mid-European Variscides", Weber et al., Mid-German Crystalline Rise & Rheinisches Schiefergebirge, Field Trip Guide to IGCP 233 Conference on Paleozoic Orogens in Central Europe—Geology and Geophysics, Göttingen-Giessen, 1990, pp. 101-114.

Declaration of Non-Establishment of International Search Report in PCT/DE03/01002 dated Aug. 1, 2003.

*Primary Examiner*—Edward Lefkowitz
*Assistant Examiner*—Punam Patel
(74) *Attorney, Agent, or Firm*—Marshall, Gerstein & Borun LLP

(57) ABSTRACT

A method for determining deformations of a body by which the effect of forces on the body is analyzed, including determining the way an equilibrium of forces between internal and external forces for a whole body or a part of it dependent on the material properties and the external boundary conditions comes about, by determining the deformations such that all acting forces are represented by the formula $$f_{ext} + m_{syst} + m_A + f_{s(ext)} + m_{s(syst)} = 0.$$

7 Claims, 19 Drawing Sheets

METHOD AND DEVICE FOR DETERMINING DEFORMATIONS

CROSS REFERENCE TO RELATED APPLICATION

This is the U.S. national phase of International Application No. PCT/DE03/01002 filed Mar. 26, 2003, the entire disclosure of which is incorporated herein by reference.

BACKGROUND OF THE INVENTION

1. Field of the Invention

The invention is concerned with a method and device to assess deformation of a body by a precise examination of how an influx of energy due to loading causes a deformation.

2. Related Technology

Several procedures are known by which the deformation of a body due to action of forces is assessed.

The known procedures are based on the method to represent the body through a grid of nodes; for every grid node the change of the relative position due to the action of forces is assessed.

These procedures are rather cumbersome for complex body shapes and especially for very precise solutions at small relative scale. For example, the modelling of deformation of a vehicle due to a crash requires an extremely high calculation power.

Although the known procedures employ mathematical models that are in principle fairly simple—the employed mathematical models are essentially based on the work of Euler in the 18$^{th}$ century—there are no procedures known so far that differ fundamentally from the procedures based on Euler.

The inventor has developed a theoretical approach to the theory of deformation which are presented in a number of freely available articles.

The first of these articles, "An approach to deformation theory based on Boyle's law. I. The concept, and kinematics of pure shear" offers a concept to assess the kinematics of deformation of a solid based on an adaptation of the ideal equation of state PV=nRT. This theory makes it possible to consider deformation involving both isotropic and anisotropic materials and/or boundary conditions.

Further developments to the kinematics of deformation have been presented in the article "An approach to deformation theory based on Boyle's law. II. Kinematics of simple shear, and some energetic considerations."

The necessity to consider a full deformation in three dimensions even for very simple geometric setups is explained in the article "An approach to deformation theory based on Boyle's law. III. Three-dimensional properties of plane-strain deformation: origin of conjugate joint sets, sheath folds in plastic shear zones, and turbulence in viscous flow."

GENERAL DESCRIPTION

The invention develops a general method to the point where it delivers solutions to specific tasks as quickly and reliably as possible.

In the sense of this invention the problem is solved by the assumption that a point Q within a body of solid is thought to serve as a reference point which is separated in all directions from corresponding points P through a unit distance. The points P serve as direction indicators relative to Q; together they form a surface which has spherical shape under ideal conditions. The change of location of all P relative to Q as a function of the acting forces describe the deformation at the point Q. In the traditional procedure a grid of nodes is pre-defined, and all points serve simultaneously as reference points and as correspondence points. Therefore the accuracy of the procedure is dependent on the number of point pairs included in the consideration which may be very high, but which is necessarily finite, and thus there are gaps. In contrast, in the procedure proposed here any point can serve as reference point $Q_1$, but the surface of all respective points $P_1$ is then defined; if the physical relations at $Q_1$ are considered, it is irrelevant that a point $P_1$ may serve itself as a point $Q_2$. This way there is an infinite number of P for every Q, and within the defined domain of validity (i.e. the shape of the body of solid) there is an infinite number of Q, which makes it therefore possible to apply the method as a homogeneous differential approach.

| Previous method | Method presented here |
| --- | --- |
| The grid of nodes needs to be pre-defined (FIG. 01). | Any point may serve as point Q which is therefore by definition surrounded by a surface of all points P (FIG. 01). |
| The number of nodes may be arbitrarily large, but it is finite. | The number of points P for every Q is infinite. |
| The number of connecting lines between pairs of points grows with the number of points considered, but it is discrete, and every pair requires its own mathematical modelling. | The number of connecting lines between one Q and all corresponding P is infinite. Their mathematical treatment therefore permits a continuous field method. |
| The distance between any two points is finite. | The distance Q→P is scale-independent. |
| Two arbitrary nodes in the grid may serve as starting point and end point of a given distance. | The distance $r_0$ is the distance between a Q and a corresponding P, but not between two Q. There is no relation between the surface point $P_1$ of a norm volume centered at $Q_1$ and another $Q_2$, (not even if $P_1$ is simultaneously some other $P_2$,) except if a $P_1$ happens to coincide with a $Q_2$. |
| Deformation is modelled through a change of this distance in length and/or direction relative to one node or the other, and relative to an external reference frame. | Deformation is modelled by means of r relative to its own reference point Q only, and only indirectly relative to an external reference frame. |

-continued

| Previous method | Method presented here |
|---|---|
| The modelling of deformation is constrained to the x discrete connecting lines of all pairs of points in the grid. | The modelling of deformation is homogeneous-continuous over all P relative to their respective Q, and homogenous-continuous over all Q relative to an external reference frame. |
| Deformation is understood as a mathematical mapping of mass points from the undeformed into the deformed configuration. To prevent the mapping of two mass points upon one another it is necessary to apply the compatibility equations apparatus. | Deformation is understood as an energetic change of state. Two different points P and Q cannot coincide because the work equation is logarithmic, thus infinite work would be required to let two points coincide. The mathematical apparatus of the compatibility equations is therefore not necessary. |

Symbolic Terminology

| T, M, F | tensors | f, m, r, s, v | vectors |
|---|---|---|---|
| I | identity tensor | n, t | unit vectors |
| $T_{ij}, F_{ij}$ | tensor components | $r_i$ | vector components |
| P, V, H, U | scalars, state functions | f, r | vector magnitudes |
| P, Q | points | $\alpha, \gamma, \theta$ | angles |

The forces which displace the surface of all P consist of the sum of external forces $f_{ext}$, the forces exerted by the system upon the surrounding $m_{syst}$, and the surface-bonding forces $m_A$ which do not do work themselves (they are constraining forces), but they make work done by stretching components of $f_{ext}$ and the shear components $m_{s(syst)}$ and $f_{s(ext)}$ possible:

$$f_{ext} + m_{syst} + m_A = 0 \qquad \text{(Eqn. 01)}$$

The new elements in this method to consider loading and deformation are the introduction of a region in space of fixed extent (the system) which is separated from its environment, and with which it interacts mechanically, and whose physical properties are scale-independent (independent of the size of the system), the explicit separation of forces $f_{ext}$ which are controlled and exerted by the surrounding upon the system, and the forces $m_{syst}$ which are exerted by the system upon the surrounding, the inclusion of the existence of bonding forces $m_A$ (permanent within a solid, transient in a fluid) which considerably constrain the freedom of the system to react upon external forces, and the assessment of the energetic effect of shear forces (the work done by shear forces) and the transformation of the shear components $f_{s(ext)}$ and $m_{s(syst)}$ of the vector fields $f_{ext}$ and $m_{syst}$ into normal components parallel to the main extending direction.

The invention thus presents a method to assess deformation of a body whereby it is the main concern how the action of forces affect the body. It is done in such a way that the equilibrium between internal and external forces is established as a function of material properties, external boundary conditions, and the existence of bonding forces between system and surrounding, both for a representative part of the body, and for the body as a whole. The material properties must be known as a function of the location $Q(x_i)$. Likewise, the configuration of the external boundary conditions (properties of the external force field) must be known.

The entire work done by the external vector field is determined through the partitioning of normal forces and shear forces according to the equation $$r^*f = \sqrt{|r \times f|^2 + |r \cdot f|^2} = |r||f| = \text{const} \qquad \text{(Eqn. 18)}$$

The radius r is a mechanical lever. Within a time period that is short relative to the material-dependent diffusivity or the relaxation time, the method is also applicable to fluids (liquids and gases).

The total displacement is determined through a work equation that must be derived from the equation of state applicable to the material under consideration. In the simplest case the work equation is $$\int f \, dr = c \int \frac{dr}{r} = c \ln r, \qquad \text{(Eqn. 20)}$$

which is derived from the ideal gas equation of state PV=nRT.

In the following description the invention is explained using two-dimensional examples. An expansion to three dimensions can be achieved without difficulty.

BRIEF DESCRIPTION OF THE DRAWINGS

FIG. 03 shows relation of minimal and maximal external forces relative to the operative field. Gravitational forces are not considered. Confining pressure and operative field are isotropic-hydrostatic.

FIG. 12: Geometry of simple shear. (a) Calculated geometric properties: $x_i$, $X_i$: coordinates, c: contracting eigendirection, e, extending eigendirection, ⊥R: direction from the origin to the point R and perpendicular to the R(iedel) plane; ⊥P: direction from the origin to the P-point, and perpendicular to the P-plane. (R, P: terminology cf. Berthé et al. 1979.) (b) observed geometric properties (Weber & Juckenack 1990). The only major difference between (a) and (b) is the orientation of the grain shape foliation. It is assumed, however, that the extending eigendirection should be correlated with the crystal lattice fabric which is commonly a little lower.

DETAILED DESCRIPTION

Figure 1A:
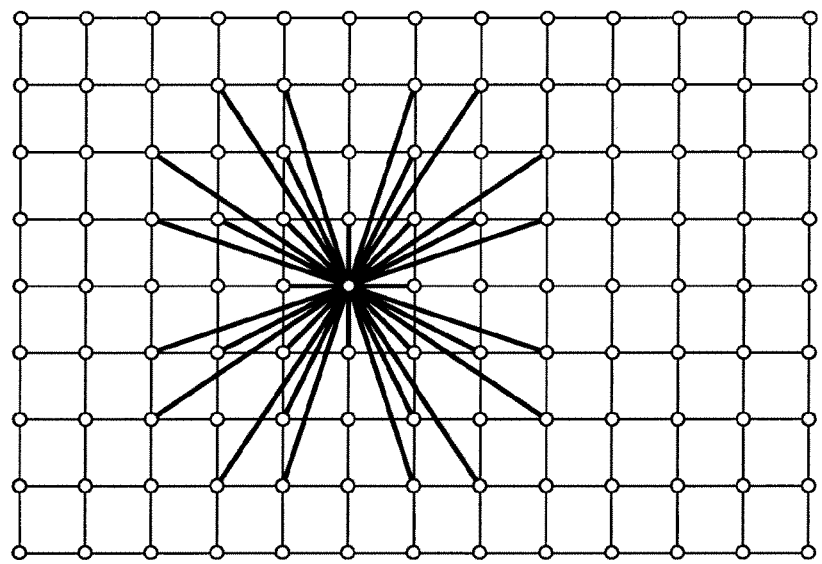
FIG. 01(a) Upper panel: Known method (finite element method): a grid of nodes is pre-defined. The deformation at the point Q is determined by considering change of length and orientation of all distances whose one end is Q. The respective outside points are the corresponding points P. The finite element method is named such because the distance between any two nodes is finite.

Model calculations are here restricted to two-dimensional cases for simplicity. In this application equations are commonly given in vector notation and in algebraic form, e.g.

$$\int f \times r \, d\theta = \int \sin\theta \cos\theta \, d\theta$$

The invention comprises four parts:
the definition of a scale-independent unit volume with a shape that fulfils the equilibrium conditions,
the definition of two force fields which are in equilibrium with one another,
the determination of a material-independent equation of state for solids, and,
the transformation of the equation of state from scalar form into vector form.

Definition of the System

The purpose of the system is the definition of a reference body in the unloaded state which represents the material properties and other mechanical properties. Due to loading, work is done upon this system which is scale-independent in the sense that similar work is done upon a small or a large system relative to the mass involved for identical respective deformations. Thus it is ascertained that it is possible to calculate with a finite radius or standard volume although their actual numerical value is irrelevant.

Any mass is associated with a potential. In the case considered here the internal energy of a thermodynamic system is considered as its potential. In a given energetic state it is proportional to its mass, $dU \propto dn$, where n is the number of mol (the thermodynamic mass is dimensionless). The energy density per unit mass is then $dU/dV=P$, in integrated form it is U/V=P, such that the mass is proportional to both U and V. U/V=P is then the energy density, or the thermodynamic potential per unit mass. The latter is then finite.

In the reference state $U_0$ we have PV=nRT. An infinitesimal change of state requires the additional energy dU. Of course, the nature of this dU at constant n is very different from that of $dU \propto dn$ above. In order to consider infinitesimal changes of state, a system of finite mass and volume is a prerequisite—a thermodynamic system—which is associated with its self-potential.

In order to define the work done on a point $P_0$, a reference point Q must be chosen such that $Q \neq P_0$. The choice is arbitrary and may be defined to the convenience of the problem (Kellogg 1929, p. 53, 63; Boas 1983). The distance $Q \rightarrow P_0$ is the zero potential distance r. If all the mass considered is confined to a certain region it may be thought to be concentrated at a point in that region. The mass may then be considered a point source, and $\int \nabla \cdot f \, dV = \kappa = const$ is independent of the limits of integration. In such a case, r is commonly chosen to be infinite, such as in gravity problems since the gravitational potential reaches zero at infinity. However, in continuum physics that option is not possible since mass and potential are proportional, and $\kappa \propto V$. The potential does not reach a limit as V is varied. Since mass is evenly distributed over the region enclosed by the thermodynamic system and in the immediate surrounding, it represents a distributed source (Kellogg 1929, p. 156). The potentials of distributed source problems are commonly logarithmic. In such a case the zero potential distance may be finite, it is then by convention often assigned unit magnitude.

In thermodynamics, the properties of substances are given in a standard state (P*, V*, T*) which may then also serve as a zero potential state, and a change of the pressure to $\pm \infty^-$ requires infinite work. The distance term r is here interpreted to be the radius $r_0$ of the thermodynamic system in the standard state. It is the one-dimensional equivalent of the volume of the mass n to which the equation of state PV=nRT is scaled. For solids which have a non-zero density in a vacuum, the zero potential state is then defined by $P^* = P_{int}$. A deviation from $r_0$ indicates a change of state. (Cauchy's continuity approach amounts to the attempt to perform a limit operation with respect to $r_0$ at constant conditions which is against the nature of the potential; Kellogg 1929, p. 63). In Part I of this series of essays, $r_0$ is set to be invariant with respect to direction, i.e. the shape of the thermodynamic system is assumed to be a sphere because it minimizes the surface-volume ratio. The material is therefore defined to have isotropic properties. In Part II, additional constraints require another shape.

Consider the divergence theorem for an isotropic state, such that only normal (radius-parallel) forces need to be taken into account, $$\int f n \, dA = \int \nabla \cdot f \, dV = \kappa, \quad \text{(eqn. 02)}$$

where n is a unit vector normal to A. Consider forces as an energy flux, $f = e_i \partial U / \partial x_i$. The surface A is closed to envelop a volume element $\int dV$; the forces are exerted by the mass in the element against the surrounding, or vice versa. At similar external conditions, a small and a large quantity of mass will do similar amounts of work upon their surrounding, relative to their mass. On this requirement of scale independence the entire theory of thermodynamics is based. Thus the thermodynamic system is a source of forces. The divergence of the force field exerted by the system (and thus also the divergence of the force field acting upon the system) is proportional to mass, hence the RHS is a linear function of V; thus div f is a constant. From this follows: at given external conditions, div f is insensitive to scale. If the scale of consideration is varied which is measured in V, and since the relation of $V \propto r^3$ to $A \propto r^2$ is not linear, the relation of A to $|f|$ cannot be constant; $|f|$ must necessarily be a linear function of scale, $|f| \propto r$. div f is the trace of the tensor F defined below. Both from eqn. 02 and eqn. 06 it follows that $$\frac{|f|}{|r|} = div \, f = const \quad \text{(eqn. 03)}$$

at constant external conditions (Koenemann 2001a), where r is the radius of the system, and r is a measure of the scale considered.

These conclusions are not changed by further developments of the divergence concept that can only be elaborated below, after explaining some context. Eqn. 03 is in agreement with the properties of a thermodynamic continuum, with the spatial properties of a thermodynamic system that interacts with its surrounding, and with the fact that the system represents a potential of distributed matter (Kellogg 1929, p. 156).

A limit operation with respect to V would not change the relation in eqn. 03, but it would vanish identically if r reaches 0. This is in accordance with potential theory (Kellogg 1929, p. 147), and a refutation of the Cauchy lemma $-f_x = f_{-x}$ for which to be valid f must reach a finite value as V and r vanish (Truesdell & Toupin 1960; Gurtin 1982; Truesdell 1992).

A thermodynamic system is defined by a chosen amount of mass. Its location in space is given by its center of mass Q in terms of external coordinates $X_i$. The surface points P of the system are given in the internal coordinates $x_i$ whose origin coincides with the center of mass of the chosen system. The physical conditions at the points P in $x_i$ are functions of $Q(X_i)$ in the sense of the definition of a vector field, $T(Q)v = x$, where T is a tensor as a function of location $Q(X_i)$, v is the location vector of a nearby point P relative to Q, and x is a vector located at P as a function of T and v.

The correlation between a surface point P and a particular direction vector in $x_i$ is unique. Another direction vector passing through P can only be part of a different system with its own origin and coordinate set, and different boundary conditions may apply to it if the gradients in $X_i$ are non-zero. It is therefore not of interest.

Derivation of the External and Material Force Fields

The definition of a tensor is the derivative of a vector field with respect to the coordinates, or the second derivative of a scalar field with respect to the coordinates (Malvern 1969, p. 57). Energy or work are such scalars. Let the external energy be $U_{ext}$ and the material internal energy be E, so $$\frac{\partial U_{ext}}{\partial x_i} = f_i \qquad \frac{\partial E}{\partial x_i} = m_i \quad \text{(eqn. 04)}$$

$$\frac{\partial^2 U}{\partial x_i \partial x_j} = \frac{\partial f_i}{\partial x_j} = e_i F \cdot e_j \qquad \frac{\partial^2 E}{\partial x_i \partial x_j} = \frac{\partial m_i}{\partial x_j} = e_i M \cdot e_j \quad \text{(eqn. 05)}$$

$$e_i \int_{r_j} \frac{\partial f_i}{\partial x_j} dx_j = Fp = f \qquad e_i \int_{r_j} \frac{\partial m_i}{\partial x_j} dx_j = Mp = m \quad \text{(eqn. 06)}$$

where r is the radius, or the position vector of a point on the surface of the system, f is the external force field; m is the material force field, or just the material field; and F and M are the tensors controlling the properties of the vector fields. F represents the external boundary conditions, and M represents the properties of the material which may be understood as a set of internal boundary conditions. Forces are understood as an energy flux that changes the internal state of the system, not as an external acceleration.

Since externally unbalanced forces cannot cause a deformation, they can be ignored. External equilibrium (Newton's equilibrium) is therefore a precondition. Also ignored are body forces as they interact with the inertial mass, but not with the thermodynamic mass. The internal (thermodynamic) equilibrium condition is then given by $$f + m = 0 \quad \text{(eqn. 07)}$$

at any point P on the surface of the system, or, if f and m are understood as functions of directions θ, $$\oint f d\theta = -\oint m d\theta \quad \text{(eqn. 08)}$$

as a sum around the system in 2D.

The external torque is balanced by definition since the interface between system and surrounding is bonded; the disequilibrium case cannot occur in an elastic medium as long as no bonds are broken. The condition $$\int f \times r d\theta = 0 \quad \text{(eqn. 09)}$$

is an equilibrium condition with surprising freedom because f and r may vary in a reciprocal way without changing the result. If $\partial r/\partial \theta = 0$, eqn. 09 is a statement of orthogonality, describing the properties of the external boundary conditions. The torque of the external forces may be balanced with additional help from surface bonding forces $m_s$. The complete condition for the balance of torque is $$\int (f \times r - m_s \times r) d\theta = 0 \quad \text{(eqn. 10)}$$

where $m_s \perp r$, their magnitude is invariant, $$\frac{\partial |m_s|}{\partial \theta} = 0, \quad \text{(eqn. 11)}$$

and $m_s \times r$ has the same sign at all surface points P. Surface bonding forces are neither external forces nor material forces; they are constraint forces which do not do work on either system or surrounding, but they make the interaction of system and surrounding possible. Their existence is concluded from the precondition that equilibrium must exist; they balance the torque of f if necessary. The subject will be illustrated later.

Eqns. 07 and 08 are important for the method because they clearly distinguish material force and external force, i.e. a material force is recognized as a physical entity of its own. It is exerted by the system upon the surrounding due to a change of state in the system resulting from the action of external forces. The system thus represents a potential. Equilibrium between system and surrounding implies that for isotropic conditions, $$\text{div } f + \text{div } m = 0; \quad \text{(eqn. 12)}$$

eqn. 12 therefore consists of two Poisson equations.

Stress in the sense of this method is a force vector field $f_{total}$ resulting from the interaction of the two independent force fields f and m, the exterior and the material force field, and their respective boundary conditions in the state of equilibrium, plus the surface bonding forces if necessary, $$f_{total} = f(f, m, m_s). \quad \text{(eqn. 13)}$$

Definition of a Material-Independent Equation of State for Solids

The ideal gas law, PV=nRT, disregards the atomic structure of matter and considers bulk behavior only. Boyle's law can be understood as a material law for ideal gases since it predicts a particular behavior of the gas upon a change of external conditions. It relates the internal energy of a system, its mass and volume to one another and thus fully describes the energetic state in which the system is. In principle, such a description of state must also exist for solids. It must therefore be possible to define an ideal solid.

The most general form of the equation of state for a solid is here chosen to be $$P^k V = z \quad \text{(eqn. 14)}$$

where $$k = \frac{\ln V_{mol}^{solid}}{\ln V_{mol}^{ideal\ gas}} \quad \text{(eqn. 15)}$$

The formula predicts that all solids have the same compressibility dV/dP if the molar volume is taken into account. z=f(P) is a number characteristic for a particular state, the function is not known. The quantum-mechanic problem as to how the volume of a solid comes about, is unsolved. It is therefore not possible to predict z, but it can be modelled through the Birch-Murnaghan equation. The latter is phenomenological, but it is successfully applied in studies of material behavior under high pressure, e.g., the prediction of the elastic properties of the Earth's core (Jeanloz & Knittle 1986).

Figure 1B:
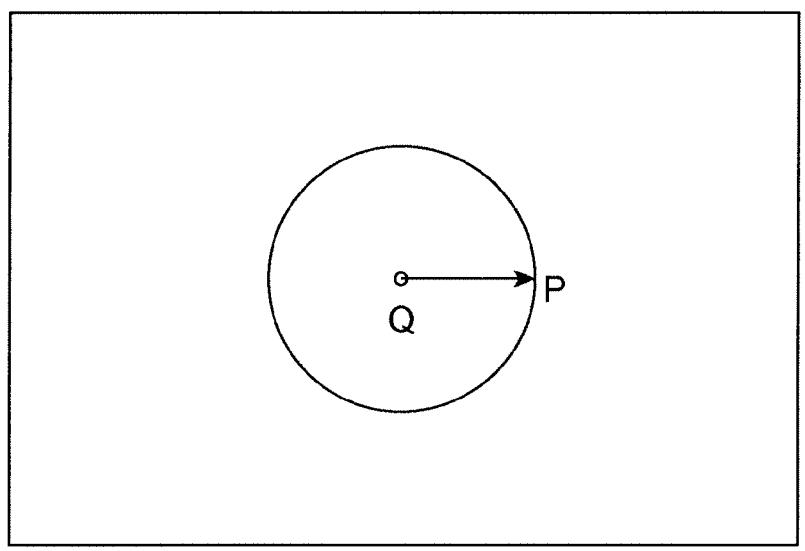
FIG. 01(b) Lower panel: Any point can serve as reference point Q, and all corresponding points P form a closed surface around Q. All relevant variables—material properties, boundary conditions, deformation—can be presented as differentiable functions of location f(Q).
Figure 2:
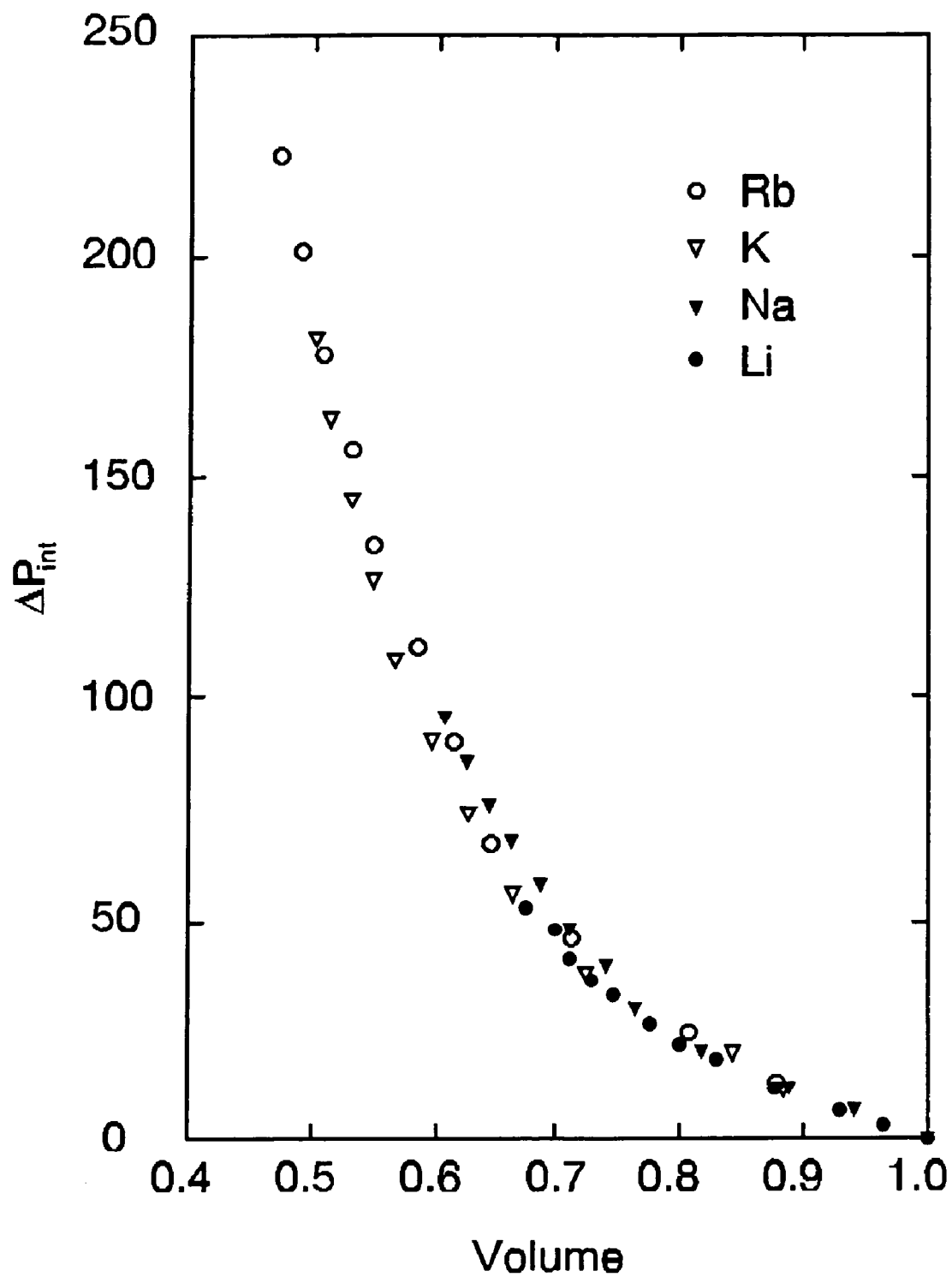
FIG. 02 Compressibility data for the alkali elements. External load expressed in multiples of the internal pressure. Data recalculated after Bridgman (1958, p. 180).

If the alkali metals are compressed up to 100 kb it is found that they all follow the same pattern to a first approximation if the externally applied load is normalized with respect to the internal pressure of the solid (FIG. 1). Thus it seems justified to use the internal pressure as a standard for the behavior of a particular material. Since eqn. 14 is isotropic, k is independent of directions and only important for the modelling of real materials. For the purposes of this paper k is assumed to be unity so that z=const. In that sense, the thermodynamic properties of the ideal solid are those of an ideal gas, and Boyle's law applies.

Transformation of the Equation of State from Scalar form into Vector Form

The most basic material law in thermodynamics is the Boyle-Mariotte law, $$PV = \text{const} \quad \text{(eqn. 16)}$$

The LHS is only the most common interpretation of the product. It may also be interpreted as a vector form of Boyle's law, $$r * f = \text{const} \quad \text{(eqn. 17)}$$

where r is the position vector of a point P on the surface of the system relative to its center of mass. The star product r*f is interpreted as $$r * f = \sqrt{|r \times f|^2 + |r \cdot f|^2} = |r||f| = \text{const} \quad \text{(eqn. 18)}$$

must be invariant with respect to direction. r*f gives the work done by an external force f, both normal and shear component, at the point P with position vector r on the surface of a thermodynamic system. Eqn. 18 is known to be an identity. If r is a unit vector, r*f=|f|; however, the ratio of |r| to |f| may now be a function of direction while eqn. 17 is still observed if |f| and |r| maintain a reciprocal relation.

Figure 3:
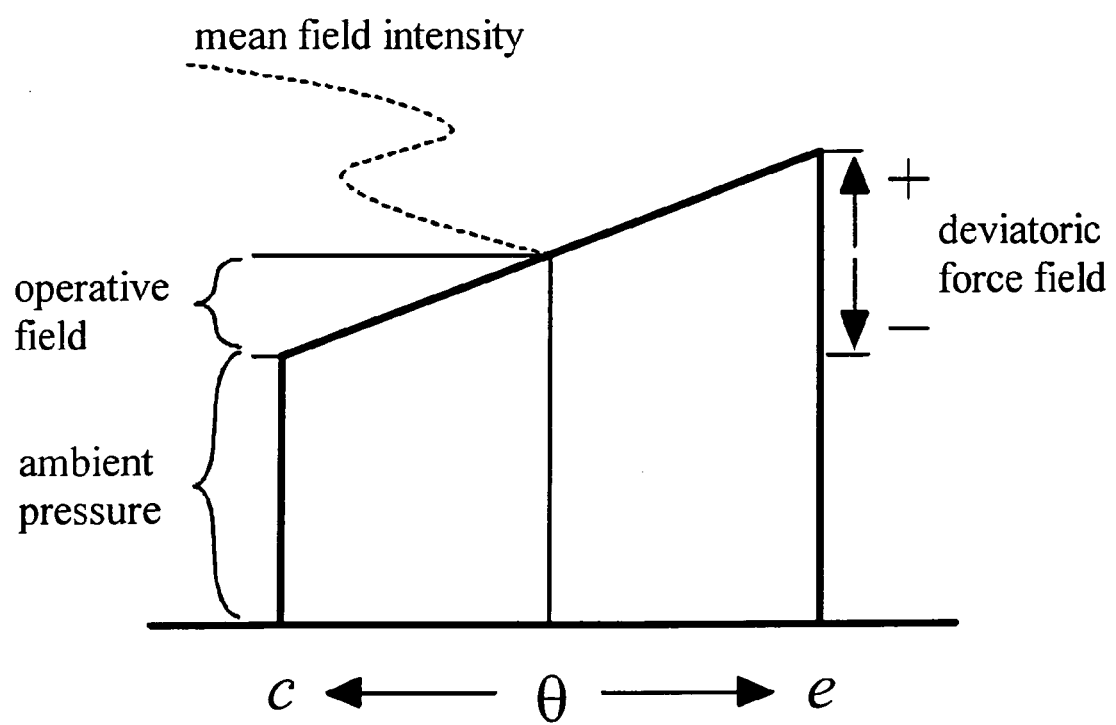
FIG. 03 Relation of $f_{op}$ to $f_{dev}$. Vertical: vector magnitude, horizontal: angular distance. The left and right side represent the contracting and extending eigendirection (c and e) of an anisotropic field. The eigendirections are orthogonal and simultaneously parallel to the principal axes of an ellipsoid only for an orthogonal field.

The force field $f_{total}$ that develops in the transition from the unloaded to the loaded state can be decomposed into an isotropic component, the operative force field $f_{op}$, and the deviatoric component $f_{dev}$; $f_{op}$ represents the change of state, and $f_{dev}$ gives direction properties. Both $f \cdot r$ and $|fxr|$ integrated over the surface of the system yield zero. Through fop a reference state is defined which serves to assign signs to the directions of the deviatoric field (FIG. 03).

In contrast to gases and fluids, solids can support shear forces, and the energetic state of a system is changed by work done by shear forces and normal forces alike. A normal force will cause an expansion or a contraction of the system, depending on its sign. The sign of shear forces indicates which way the body would spin if they were unbalanced, but it gives no hints regarding volume effects. However, the volume effect of shear forces can be only dilational. A deviatoric force field $f_{dev}$ can be partitioned into a normal component field $f_n$ and a shear component field $f_s$. Assume a spherical volume being subjected to the shear components $f_s$ of a force field with orthogonal eigen-directions, with the origin of the coordinates at the center of mass. Along the surface, all $f_s$ will act on the surface points P with position vectors r; the points P will be displaced parallel to the direction of $f_s$ to the deformed position P' with position vector r'. Since r and v=P→P are mutually perpendicular, |r'| will be larger than |r|. Therefore the work done by a shear force has a volume effect, and it is always dilational. The dilational component accumulates from zero at the contracting eigendirection towards the extending eigendirection where it reaches its maximum. This effect holds both for shear forces exerted by the surrounding on the system, and for shear forces exerted by the system on the surrounding. The combined effect of the work done by shear forces results in two additional force field components $m_{s(int)}$ and $f_{s(ext)}$ parallel to the extending eigendirection, such that due to the existence of shear forces a dilational (i.e. normal) effect is produced. Thus $$f_{total} = f_{op} + f_{dev} + m_{shear} + f_{shear} \quad \text{(eqn. 19)}$$

where $f=f_{op}+f_{dev}$, $F_{op}=cI$, and det $F_{dev}=\pm 1$. An example is given below.

Work is then calculated in analogy to PdV-work, $$\int f dr = c \int \frac{dr}{r} = c \ln r \quad \text{(eqn. 20)}$$

The relation of material distance, i.e. the radius $r_0$, to a colinear force is derived through differentiation of eqn. 18, $$r_0 df + f_0 dr = 0 \quad \text{(eqn. 21)}$$

If eqn. 21 is divided by $r_0$, integrated, and divided by $f_0$, it follows that $$\ln\left(\frac{r_1}{r_0}\right) = -\frac{\Delta f}{f_0} \quad \text{(eqn. 22)}$$

in complete analogy to $\ln(V_1/V_0)=-\Delta P/P_0$ in isotropic thermodynamics. Eqn. 22 provides the cause-effect relation, by which the displacement field $\Delta r = s$ is generated from the applied force field f which therefore have identical geometrical properties.

A solid in a vacuum has its ideal volume $V_0$ with unit radius $r_0$. The internal pressure $P_{int}$ of a solid is in the order of several kbar. In directional terms, the analogue to $P_{int}$ is the internal force $m_0$ which is a non-zero dormant force as it is internally balanced in the unloaded state. For modelling purposes it is set to unity in the following text. Above it was explained that the work done by shear forces on a volume is a dilation. Thus, be it a normal component $f_n$ or a shear component $f_s$, their combined effect, colinear with $x_i$ needs to be considered. The magnitude of the externally effective force must be scaled to that of the material force $m_0$, so eqn. 6 in complete expansion is $$-\Delta m = \Delta f_{ext} = \frac{|\Delta f_{ext}|}{|m_0|} \frac{f_{ext}}{|f_{ext}|} \quad \text{(eqn. 23)}$$

where the first RHS term gives the magnitude of $f_{ext}$ in multiples of the internal pressure of the material, and the second term is a unit vector with the orientation of $f_{ext}$. This normalization is always implied; subsequently unit magnitude is used, and $\Delta f$ is simply referred to as f.

The condition of equilibrium for the torque is dependent on the properties of the force field and the shape of the system. The variability of the shape is constrained by the properties of the external force field, the material properties, and the condition that system and surrounding are bonded. If the effect of a progressive deformation is demonstrated in 2D, commonly a circle is transformed by a displacement field into an ellipse. The unit circle of the undeformed state as a geometric device is certainly adequate for this purpose; but the shape of the thermodynamic system (or volume element) must fulfil the equilibrium conditions. Specifically, the thermodynamic system may have an elliptical shape in one particular set of conditions, but it may be a circle in another. The two concepts—a circular pattern of points in the undeformed state vs. the mechanically active shape of the system—must not be mixed up.

Strain is a function of the displacement field. If the principal axes of the strain ellipsoid do not rotate during progressive deformation they must coincide with the characteristic directions of the displacement field (and thus the force field). It can therefore be concluded that the eigendirections of the force field are mutually perpendicular, or that the force field, and hence the displacement field, are orthogonal. From a mathematical point of view this is a rather special case, however, and by no means a precondition. The strain tensor is thus not a helpful term to understand the physics of deformation. It is therefore necessary (a) to establish the shape of the system from the equilibrium conditions, and (b) to find the eigendirections of the force field. They are defined as the directions along which the force field f has no shear force components.

Shape of the Volume Element

Figure 4:
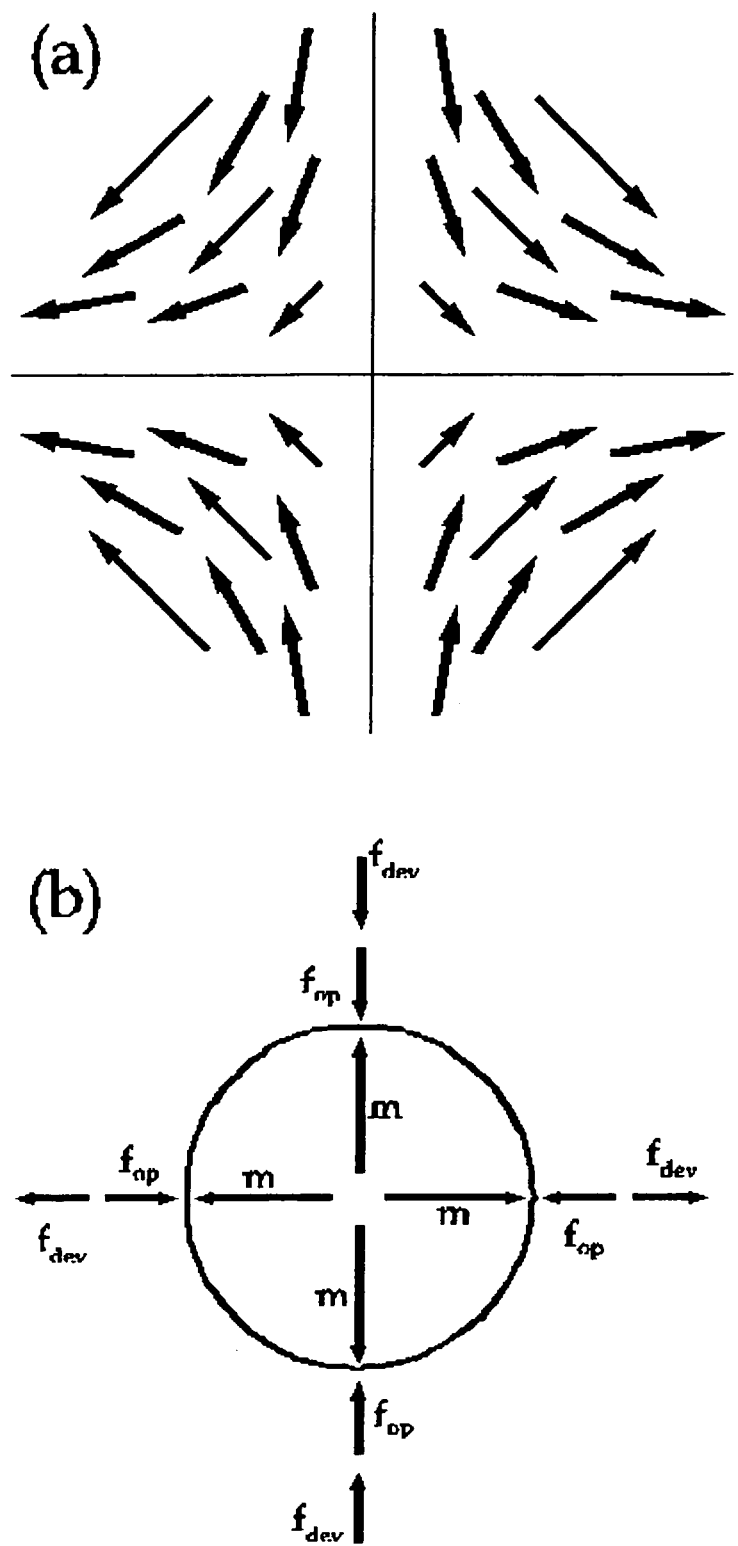
FIG. 04(a) Deviatoric force field for pure shear. $f_1$ and $f_2$ are perpendicular to one another and parallel to the coordinates and the eigendirections of the field. The same figure represents the displacement field or flow field if the arrows stand for displacements. (b) Orthorhombic entire force field, schematically. $m_i$: material force, $f_{op}$: hydrostatic operative pressure, $f_i$: deviatoric force field.

Eqn. 18 gives constraints for the shape of the system. The simplest shape is the sphere—it is isotropic, minimizes the A/V ratio, and for any point source at the center of mass its surface is an equipotential surface. For isotropic external conditions and an isotropic material a spherical shape for the system is the most natural choice as there are no shear forces. For other deformation types eqn. 18 implies that radius and normal force along the contracting eigendirection c and those along the extending eigendirection e are identical in magnitude. The curl of the pure shear deviatoric field (FIG. 04)

$$F_{dev} = \begin{bmatrix} -\frac{\partial f_2}{\partial x_2} & 0 \\ 0 & \frac{\partial f_1}{\partial x_1} \end{bmatrix} = c \begin{bmatrix} -1 & 0 \\ 0 & 1 \end{bmatrix} \quad \text{(eqn. 24)}$$

is zero; therefore the eigendirections of the resulting force field coincide with those of $F_{dev}$. The conditions tr T=0 and det T=±1 are both conservation conditions und must hold simultaneously, hence $|F_{11}|=|F_{22}|=1$. Since $F_{dev}$ is orthogonal, there are no constraints from the equilibrium conditions on the shape of the volume element; it is therefore still spherical in shape.

Figure 5:
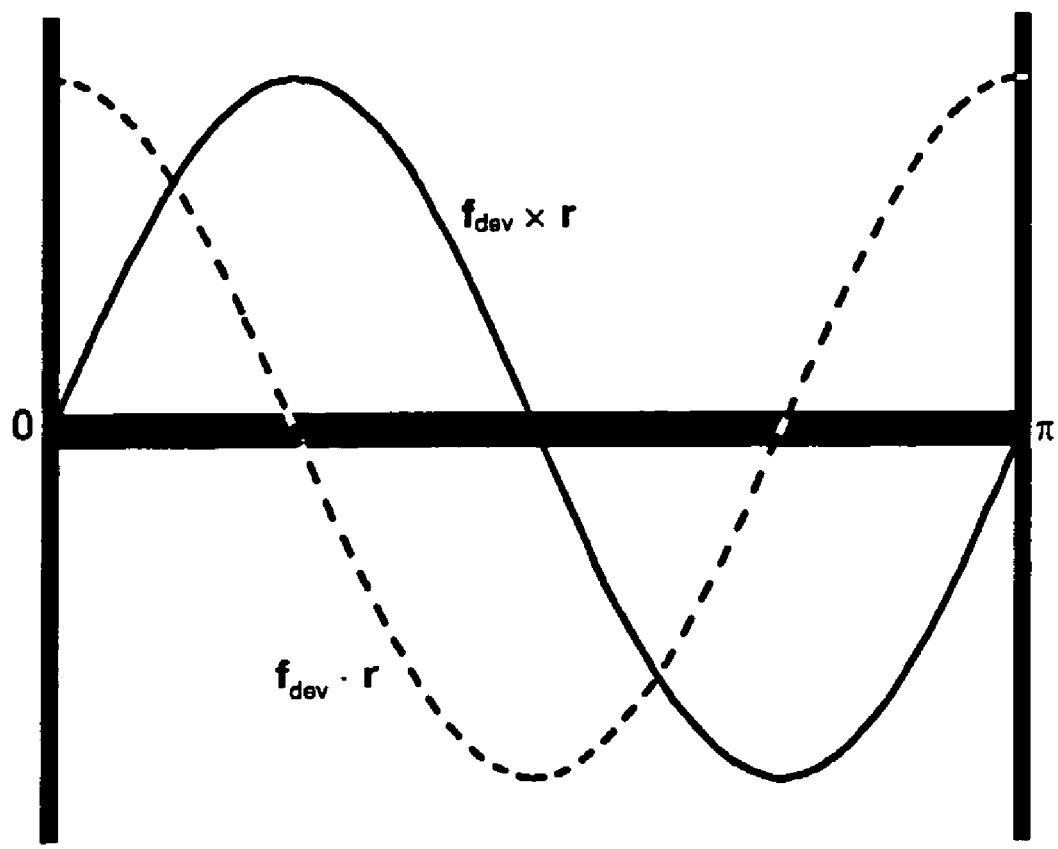
FIG. 05 Force magnitudes along the surface of a unit body for pure shear. Continuous line: $f_n$, dashed line: $f_s$. Their sum is unity at all points.

The magnitudes of normal and shear deviatoric forces are shown in FIG. 05. Under the given boundary conditions, all deviatoric forces on the surface have the components f=[cosθ, −sinθ] where θ is the angle between the orientation of r and the $x_1$-coordinate. The external equilibrium condition for the torque for the entire body is then $$\int_0^{2\pi} f \times r d\theta = 2\int_0^{2\pi} \cos\theta \sin\theta d\theta = 0, \quad \text{(eqn. 25)}$$

i.e. it is balanced without the help of the surface bonding forces $m_s$.

Kinematics of Pure Shear $m_0$ is the material force which is in equilibrium with a vacuum. For a body with unit radius in an orthorhombic deviatoric field, the components of the position vector r of surface point P are $[r_1\ r_2]=[\cos\theta\ \sin\theta]$; the operative force vector is a normal force with components $f_{op}$ proportional to $[-\cos\theta\ -\sin\theta]$; the deviatoric force $f_{dev}$ is proportional to $[\cos\theta\ -\sin\theta]$; and the radius-normal unit vector $t=[\sin\theta\ -\cos\theta]$.

External forces acting on point P are the isotropic operative force $f_{op}$ and the deviatoric component $f_{dev}$. $f_{op}$ consists of normal components only. $f_{dev}$ can be split into a normal component $f_{n(dev)}$ and a tangential component $f_{s(dev)}$. The sum of all normal components is $$\Sigma f_n = f_{op} + (r \cdot f_{dev})r = 1 + (\cos^2\theta - \sin^2\theta) \quad \text{(eqn. 26)}$$

The respective inward-directed displacement vector $s_n$ parallel to r is found through eqn. 22.

Figure 6:
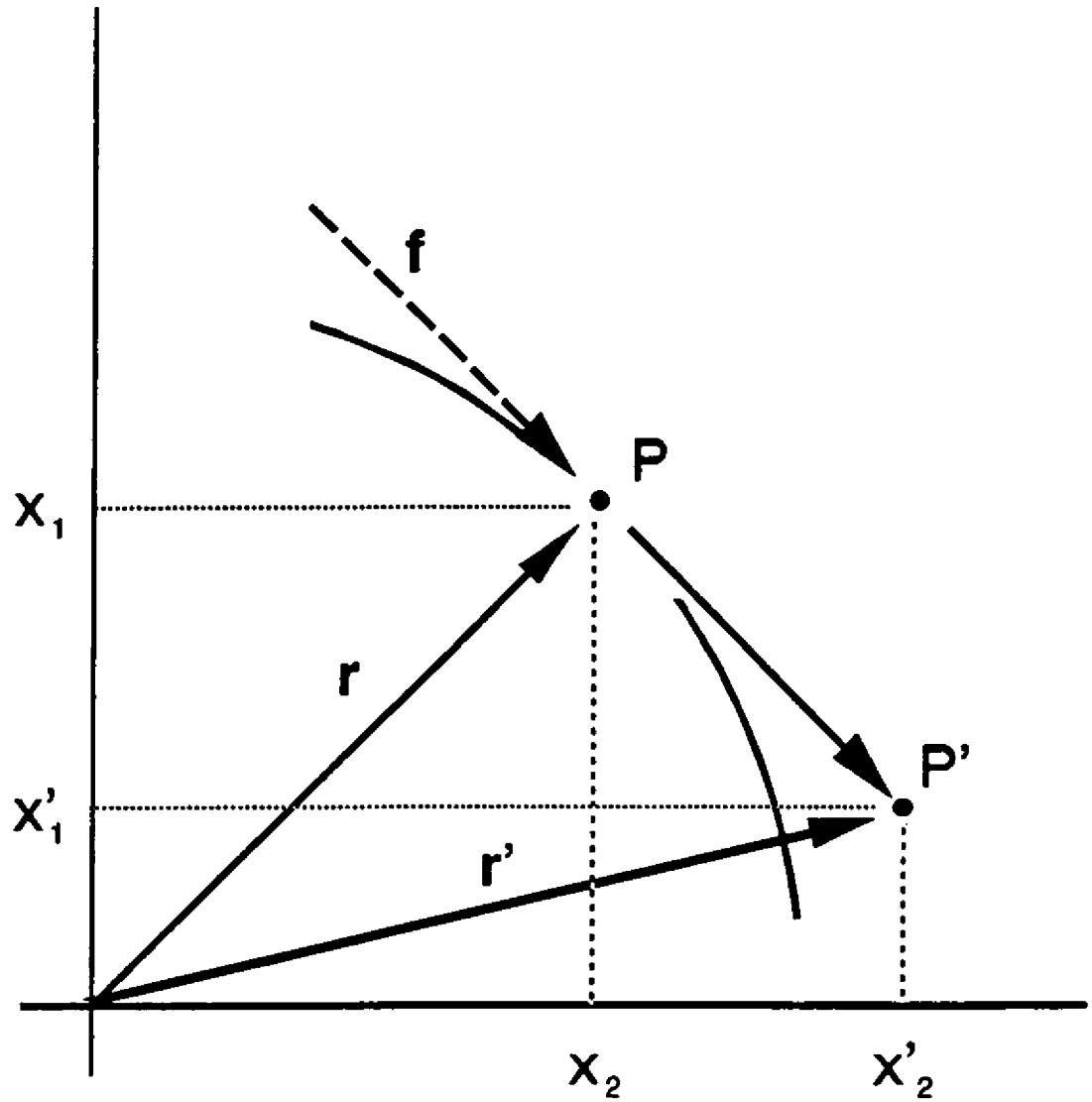
FIG. 06 Dilatancy effect of a shear force. Circular line: surface of a thermodynamic system. Tangential force vector (dashed) will displace material point P from P to P'; the distance from the origin increases. Point coordinate $x_1$ will be stretched by horizontal component of f to $x_1'$, $x_2$ will be shortened by vertical component of f to $x_2'$. $X_i$: external coordinates parallel to the eigendirections.

The cross product $$|r \times f_{dev}| = |f_{s(dev)}| = 2\cos\theta\sin\theta \quad \text{(eqn. 27)}$$

is equivalent to f·t. A shear force has the effect that P is displaced away from the contracting eigendirection, and towards the extending eigendirection (FIG. 06). The components of $f_{s(dev)}$ at P evoke elastic material forces of equal magnitude and opposite sign within the system such that the torque at P is balanced. The effect of $f_s$ is that P is displaced to P' (FIG. 06); however, since $f_s$ is perpendicular to r, the distance r' from the origin to P' will always be larger than that from the origin to P (FIG. 06). That is, a shear force will always cause a local extension proportional to its magnitude. That effect is additive from point to point. The observed dilation at P' is therefore the sum of all dilations from the contracting eigendirection to P, $$\int (f_{dev} \cdot t) r d\theta = 2\int_0^\alpha \sin\theta \cos\theta \sqrt{\cos^2\theta + \sin^2\theta} d\theta \quad \text{(eqn. 28)}$$

where α is the angular distance measured from the contracting eigendirection c at $x_2$ to P. For α=π/2, $\int f \cdot t\ d\theta=1$. At the lower limit of integration there is no dilational effect, naturally; the integral reaches its highest value at the extending eigendirection e although no shear forces are observed at that point.

In a continuum, the result of eqn. 28 counts twice. Assume a body loaded hydrostatically so that the operative force field (the change of the energetic state of the system) has magnitude −1, and the deviatoric field has magnitude zero. Along $x_1$ and $x_2$ the radius is contracted. Then the boundary conditions are relaxed along $x_1$ only; consider the surrounding as immobile. In the attempt to reduce the stored energy, the material expands by itself parallel to $x_1$ whereas nothing changes along $x_2$. The operative field magnitude is reduced to −½, and a deviatoric field of magnitude ±½ develops. Since the expansion is not isotropic, the body will exert shear forces at the surrounding; in the first quadrant (to the right of the contracting eigendirection and above the extending eigendirection) it will result in a sinistral couple at the system-surrounding interface, and in a dextral couple in the second quadrant (counting clockwise). Therefore, work is done by the system on the surrounding, thereby reducing the energetic state of the system from −1 to −½, until the system has reached its energetic minimum state. Note, however, that the sign of the couples is opposite to what should be expected from a proper continuum pure shear case. But if the surrounding deforms with the system, it will first expand with the system in $x_1$, and then exert additional shear forces at the system, causing a dextral couple in the first quadrant and a sinistral couple in the second, resulting in a further expansion parallel to $x_2$. This shear work is work done by the surrounding, and will cause an increase of the energetic state from −½ to −1. Therefore one part of the expansion is supplied by the shear effect of the material, one part by the shear effect of the external force field, and both are proportional to the magnitude of the deviatoric field. The result is that a dilational force of twice the magnitude of the integrated external shear forces acts upon the surface point on the extending eigendirection which will therefore be shifted away from the center of the system.

Volume Effect of Deviatoric Loading

Figure 7:
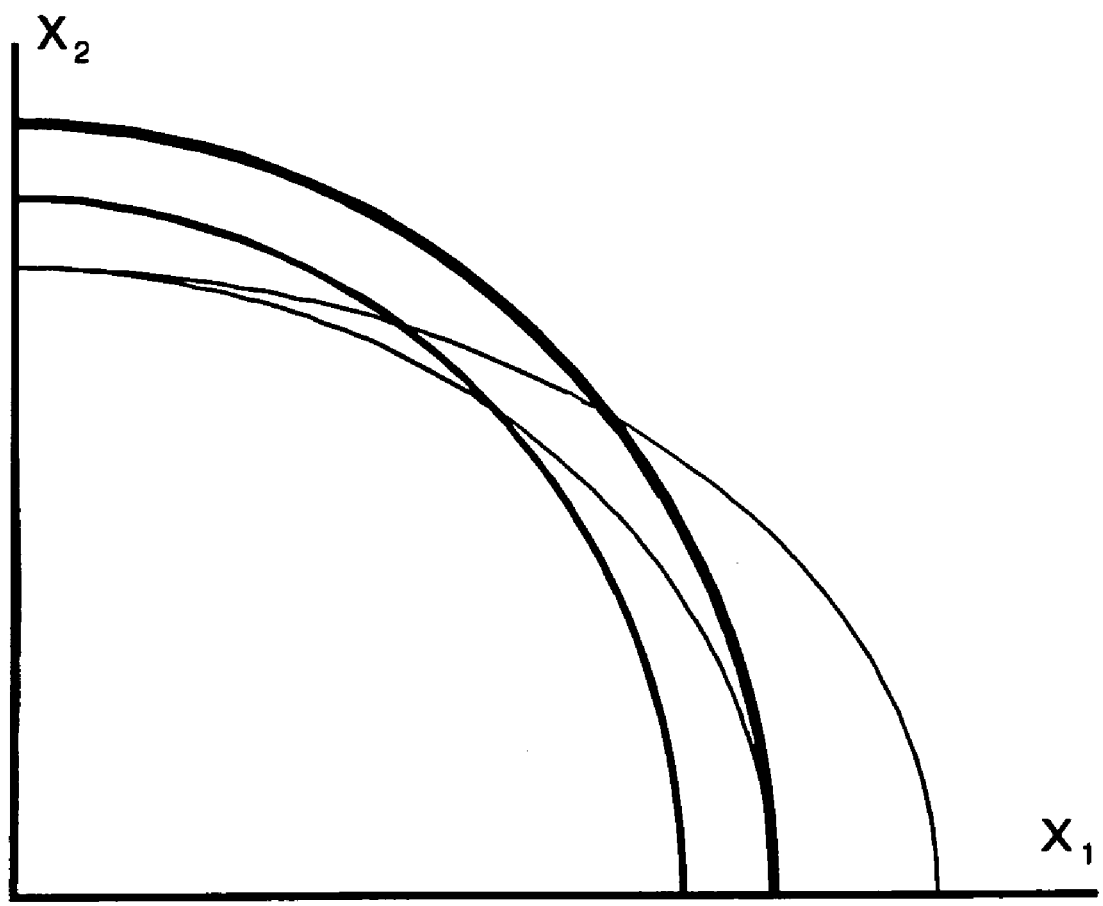
FIG. 07 Outer bold line: surface of a unit body before loading. Inner thin line: unit body after hydrostatic loading due to an operative field, resulting in volume decrease. Inner elliptic line: change of shape of the loaded body only due to normal components of the deviatoric field; the volume effect is zero. Outer elliptic line: finite deformation after consideration of the work done by shear forces. Area between the two elliptic lines: volume increase due to the dilatancy effect. $X_i$: external coordinates parallel to the eigendirections.

A numerical example, using eqn. 22 (inward-directed work is positive): $r_0=1$, $f_0=1$, and volume $V_0/\pi=1$. After loading to operative field magnitude ⅕, the magnitudes along $x_2$ are $\Delta f=f_{op}+f_{n(dev)}=⅖$, $r_2=0.670$, and along $x_1$ they are $f_{op}+f_{n(dev)}=⅕-⅕=0$, $r_1=1.000$; but $f_{s(int)}+f_{s(ext)}=-⅖$, so $r_1=1.492$. The volume of the resulting ellipse is $V/\pi=r_1 r_2=1$, i.e. area is preserved if compared with the unloaded state (FIG. 07).

Model Calculations for Simple Shear

The Eigendirections

The position O of the body center in space is given in coordinates $X_i$. A second coordinate set $x_i$ is fixed to the body, its surface points are given relative to O in the latter system.

For a dextral shear the deviatoric external force field therefore has the form $F_{ext} r = f_{ext}$ where $$F_{ext} = \begin{bmatrix} 0 & \frac{\partial f_1}{\partial x_2} \\ 0 & 0 \end{bmatrix} \quad \text{(eqn. 29)}$$

Figure 8:
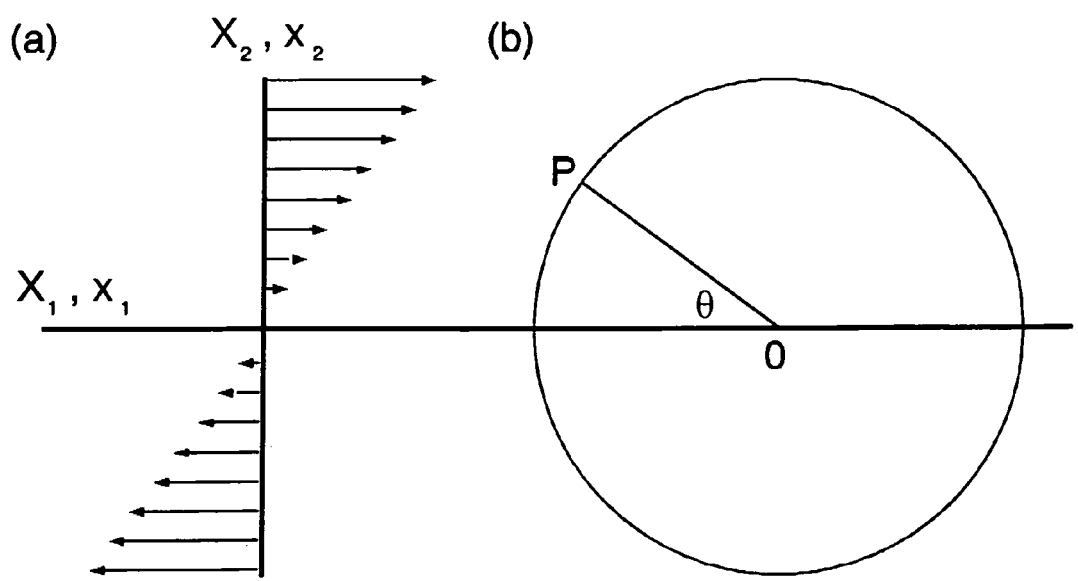
FIG. 08 External force field for simple shear with unit body. (a) The force field consists only of forces parallel to $X_1$. (b) The unit body is fixed in space and cannot rotate due to bonds between body (system) and surrounding. P: point of action of a force vector, O: coordinate origin, θ: angle between position vector of P and internal coordinate $x_1$.

(FIG. 08a). This field interacts with a unit body (the thermodynamic system) possessing isotropic material properties (FIG. 08b). Thus, in a continuum an infinite number of force vectors will act at an infinite number of points of action along the surface of the system. Therefore it is necessary to find the average point of action of the average force vector $f_{av}$ on the body. From the statement of the problem (FIG. 08), f∝sin θ where θ is the angle enclosed by r and the reference line $x_1$. The average for one quadrant is found through $$\frac{\int_0^{\frac{\pi}{2}} \sin\theta d\theta}{\frac{\pi}{2}} = \frac{2}{\pi}. \qquad \text{(eqn. 30)}$$

Figure 9:
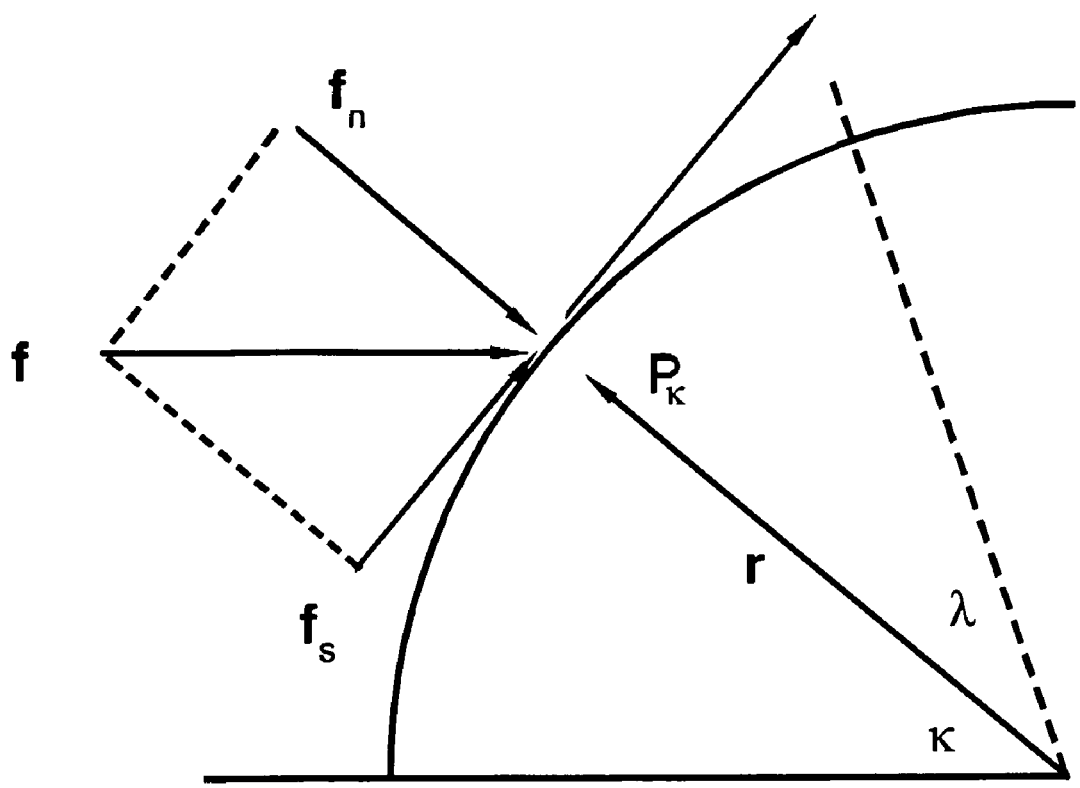
FIG. 09 Forces on the surface of a volume element in a continuum subjected to a force field as shown in FIG. 08. Average force $f_{av}$ acting on its point of action $P_\kappa$ on the surface of the system during external conditions of simple shear. $f_{av}$ with magnitude sin κ decomposes into normal component $f_n$ and shear component $f_s$. The latter is balanced by surface bonding forces. $f_{s(\kappa)}$ is subtracted from all shear forces at all points, resulting in sinistral shear forces between $P_\kappa$ and 0. λ is the angle of a coordinate transformation which results from the imbalance between the shear forces over the surface of the system. The equilibrium condition $\int f \times r \, d\theta = 0$ is observed.
Figure 10:
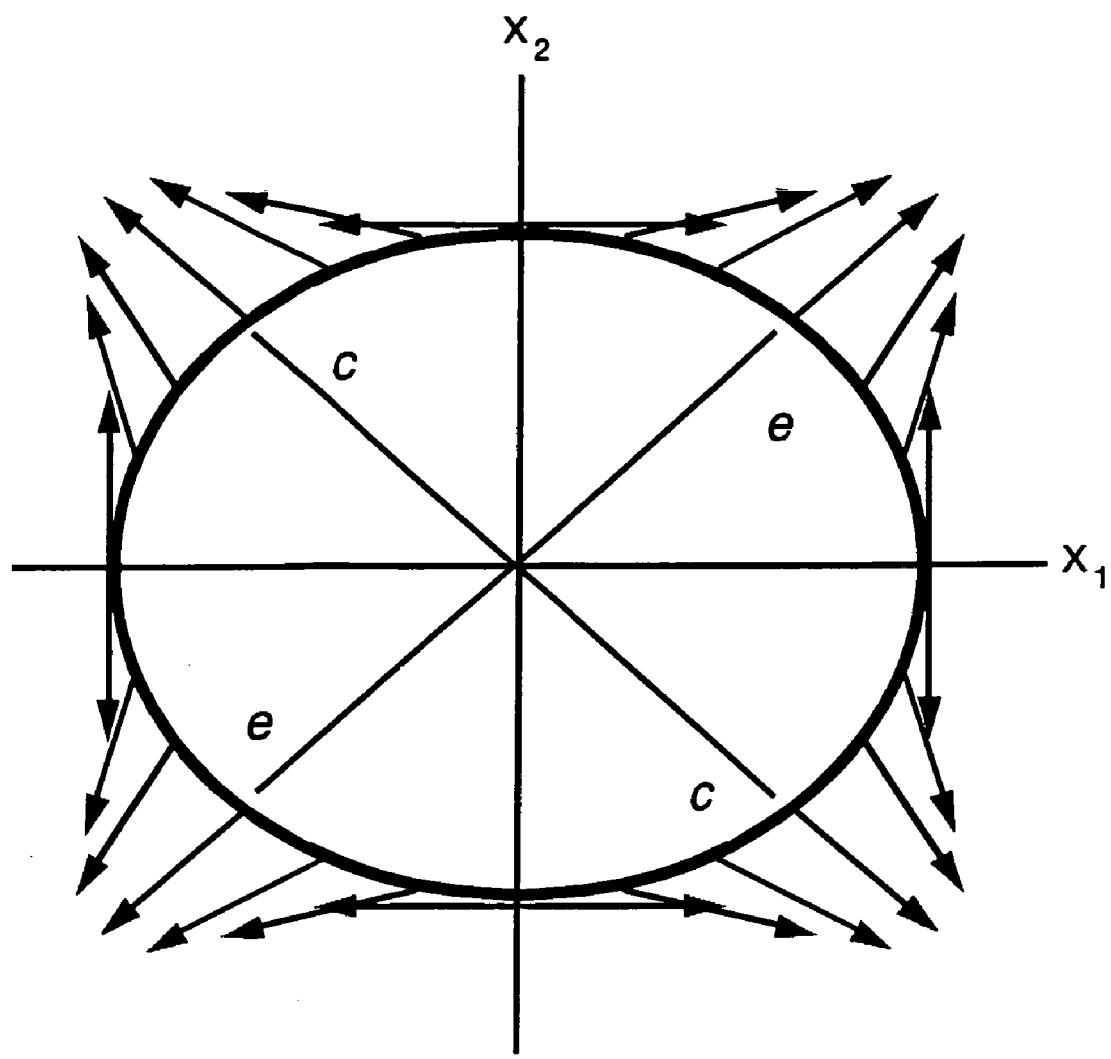
FIG. 10 Thermodynamic system, resp. volume element with unit mass and elliptic shape which is in equilibrium with a monoclinic external force field. Acute angle between eigendirections c and e=2κ.

The average force is a vector of the form $f_{av}=[2/\pi, 0]$, and the position vector of its point of action $P_\kappa$ encloses with $x_1$ the angle $\kappa=\pm 39.54°$ (FIG. 9). If the body is fixed in space and subjected to a force field as in eqn. 30, the normal force component has the form $$f_n=(f \cdot n)n=\cos\theta \sin\theta, \qquad \text{(eqn. 31)}$$

and the shear force component is given by $$f_s=(f \cdot t)t=\sin^2\theta. \qquad \text{(eqn. 32)}$$

At $P_\kappa$ the latter is therefore $$f_{s(\kappa)} = \left(\frac{2}{\pi}\right)^2 = 0.405. \qquad \text{(eqn. 33)}$$

If the body is allowed to react to the applied force field, $f_{s(\kappa)}$ is accommodated: since the coherence is maintained, external disequilibrium is impossible. Hence the system is not able to rotate freely, but surface bonding forces m, will be activated parallel to its surface. Thus $|f_{s(\kappa)}|$ is subtracted from all $|f_s|$ at all points; the sign of the effective $f_s$ will be reversed in some areas. The effective shear force magnitude at any point P is therefore $$|f_{s(eff)}|_\theta = f_\theta \cdot t_\theta - |f_{s(\kappa)}|, \qquad \text{(eqn. 34)}$$

and the total effective force at $P(\theta)$ is $$f_{eff}=f_{s(eff)}+f_n. \qquad \text{(eqn. 35)}$$

Initially there are two points with no radius-normal force components at $\theta=0$ and $\theta=\pi$ (FIG. 08b). Due to the subtraction of $f_{s(\kappa)}$, these points move away from $x_1$ by $\theta=\pm-\kappa$ to either side of the coordinate axis. Since only normal components act along these directions, they are interpreted as eigendirections (contracting: c, extending: e) which are not mutually perpendicular. They enclose the angles $\pi-2\kappa=100.92°$ and $2\kappa=79.08°$. However, by using the unit vector n and $t \perp n$ in eqns.31 and 32, a spherical shape of the system is implied because there is no difference yet between n and r. It is still not possible to balance the rotational momentum for a body with a spherical shape as $\int_{2\pi} |f_{s(eff)} \times r| d\theta \neq 0$. Therefore the assumption regarding the shape may be faulty. The angular relation of the eigendirections suggests that the effective force field $f_{eff}$ for simple shear and the shape of the system both have elliptical properties. It is therefore necessary to calculate the shape of the ellipse which is in equilibrium with $f_{eff}$ with eigendirections as indicated above, and which fulfils the requirement of eqn. 18.

Force Field and Shape of Volume Element

In the pure shear example (PS), the field property tensor (eqn. 24) has the properties tr $F_{PS}$=0 and det $F_{PS}$=±1. Eqn. 29 for simple shear (SS) differs in the latter point. However, the term in eqn. 33 is not part of eqn. 29. The field matrix for simple shear is therefore assumed to be characterized by the condition det $F_{SS}$=±1 after the subtraction, indicating that all normal fluxes that are part of the deviatoric field and which enter the system, will leave it as well. Thus, the force field under the boundary conditions for elastic simple shear and the shape properties of the system are here modelled by assuming an orthogonal field of the form $$F_0 = \begin{bmatrix} 1 & 0 \\ 0 & -1 \end{bmatrix} \qquad \text{(eqn. 36)}$$

which is in equilibrium with a system of spherical shape. The maximum shear directions should coincide with the points on the coordinates, though, so the force field is reoriented by a sinistral rotation of 45°. Both force field and radius field are then transformed by a transformation matrix T to acquire elliptical properties, where p are the position vectors of the surface points in the untransformed state:

$$T = \begin{bmatrix} \cot\kappa & 0 \\ 0 & \tan\kappa \end{bmatrix}, \qquad \text{(eqn. 37)}$$

$$TF_0 = F_{dev} = \begin{bmatrix} 0 & \cot\kappa \\ \tan\kappa & 0 \end{bmatrix} = \begin{bmatrix} 0 & T_{11} \\ T_{22} & 0 \end{bmatrix}, \qquad \text{(eqn. 38)}$$

$$Tp = r_{ell} = [T_{11}\cos\theta \quad T_{22}\sin\theta], \qquad \text{(eqn. 39)}$$

and $$F_{dev}p = f_{dev} = [T_{11}\sin\theta \quad T_{22}\cos\theta]. \qquad \text{(eqn. 40)}$$

The eigendirections of the elliptic radius field $r_{ell}$ are thus mutually perpendicular, and identical to the principal axes of the resulting ellipse with area $A/\pi=T_{11}T_{22}=1$ whereas the eigendirections—extending: $v_e$, contracting: $v_c$—of the force field are non-orthogonal as desired, $$v_{e,c} = \begin{bmatrix} 1 \\ \pm\tan\kappa \end{bmatrix}. \qquad \text{(eqn. 41)}$$

Kinematics of Simple Shear

Conveniently, all equations regarding equilibrium conditions etc. are just transformed forms of the pure shear example, too. The cross product simplifies to $$\oint |f_{dev} \times r_{ell}| d\theta = T_{11}T_{22} \oint (\cos^2\theta - \sin^2\theta) d\theta = 0, \qquad \text{(eqn. 42)}$$

i.e. the elliptic properties of radius field and force field cancel. The linear momentum is $$\oint f_{dev} \cdot r_{ell} d\theta = (T_{11}^2 + T_{22}^2) \oint \cos\theta \sin\theta d\theta = 0. \qquad \text{(eqn. 43)}$$

Figure 11:
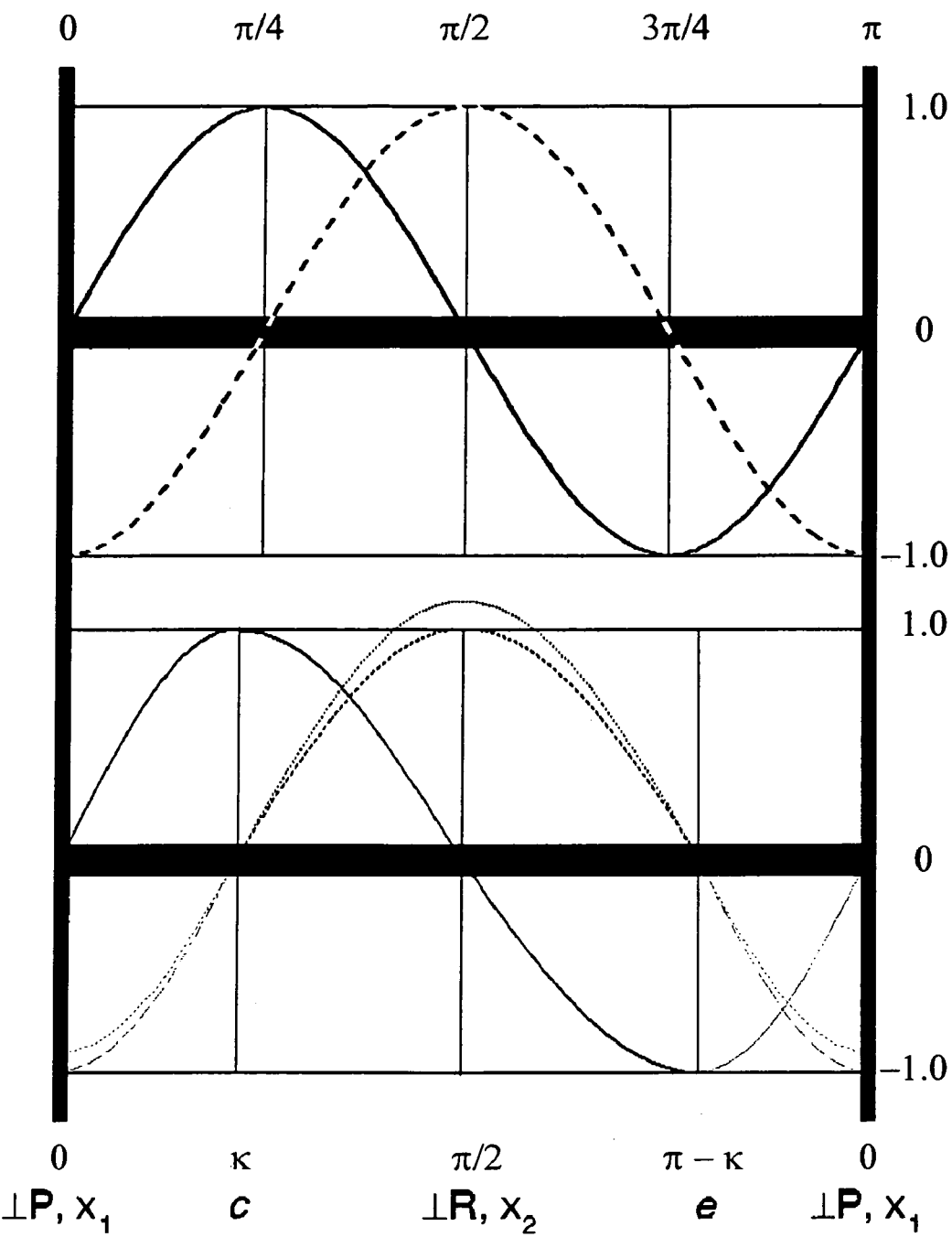
FIG. 11 Vector magnitudes in simple shear. (a) in untransformed space, (b) in transformed space. Continuous line: normal component $f_{n(dev)}$ (eqn. 44), long-dashed line: $|f_{dev} \times r_{ell}|$ (eqn. 42), dot-dashed line: $f_s$ (eqn. 45, see text). ⊥R, ⊥P: orientations perpendicular to R- and P-surface, cf.

Since $T_{11}^2+T_{22}^2>2$, the maximum magnitude of the dot product along the eigendirections is larger than unity. This is believed to be an artefact of the elliptic shape as the radii along the eigendirections do not have unit length due to the transformation by T. If the force is dotted with the inverse position vector $r_{ell}^{-1}=T^{-1}r$, $$\oint |f_{n(dev)}| d\theta = \oint r_{ell}^{-1} \cdot f_{dev} d\theta = \oint 2\cos\theta \sin\theta d\theta = 0 \qquad \text{(eqn. 44)}$$

the equilibrium condition is still maintained. The elliptic properties of force field and body shape cancel, resulting in a consideration of normal deviatoric force $f_{(n)dev}$ per unit radius, the maximum magnitude of which is 1. Eqn. 44 gives the normalized relation of $|f_{n(dev)}|$ to $|r_{ell}|$; that normalization of $f_n$ with respect to r is necessary (cf. eqn. 23). $f_{op}$ (cf. eqns.19 to 23) is therefore also a unit vector. Eqns.42 and 44 together observe eqn. 18. Some vector magnitudes are shown in FIG. 11.

If t⊥n, t is not a tangent vector to the ellipse, but is defined as a radius-normal unit vector, irrespective of the orientation of the elliptic surface.

The magnitude of the shear force component is given by $$|f_{s(dev)}| = f_{dev} \cdot t = T_{11} \sin^2\theta - T_{22} \cos^2\theta \qquad \text{(eqn. 45)}$$

Integration for separate sectors (e.g., from the contracting eigendirection to either side towards the extending eigendirection, or from 0 to κ and from κ to π/2) shows that there is an imbalance between dextral and sinistral shear forces acting on the system. However, eqn. 45 is not an equilibrium condition, and the shear forces by themselves need not balance. Because forces are balanced for the ellipse (eqn. 43), an imbalance in $f_{s(dev)}$ cannot imply a spin. The imbalance is therefore interpreted to indicate a permanent reorientation of the force field through a transformation of the internal coordinate axes $x_i$ with respect to the external reference frame $X_i$ by an angle λ such that $$\sqrt{|f_{s(dextral)}| - |f_{s(sinistral)}|} = \tan \lambda; \ \lambda = 28.83° \qquad \text{(eqn. 46)}$$

where the vector magnitude terms under the root stand for the integrated sums over adjacent sectors. Since the eigendirections are real, the transformation angle λ is stable. The root is taken because all angular terms in eqn. 45 are squared.

It is useful to interpret the LHS of eqn. 46 as a tangent term because there is no reason why it should be restricted to values ≦1. As the LHS→∞, λ→90°, which would be the condition for external rotation. At the same instant, the characteristic equation should degenerate, whence the eigendirections become imaginary.

The invention contains the notion that a shear force has the effect that P is displaced towards P', away from c, and towards the e. A shear force will always cause a local extension proportional to its magnitude. That effect is additive from point to point. During a simple shear elastic deformation, the same principle holds, except that the eigendirections are no longer mutually perpendicular. However, the result is similar to that of eqn. 28 (which was 1 over each quadrant), except that the surface over which is the integration is performed, is larger than that of the circular volume element. The result per quadrant is therefore larger than for a circular surface by the factor $T_{11}T_{22}/2 = 1.018$. As explained in the pure shear example (following eqn. 28), this result counts twice, $w_s = 2.036$.

$w_s$ is the dilational effect of the shear forces along the radius $r_e$ parallel to e. The shortening factor for the radius $r_c$ along c is given by eqn. 22. If $v_c$ and $v_e$ are the normalized eigenvectors, they can be understood as the radii of a unit circle subjected to the monoclinic field Fr=f, and the displacement field can be calculated. A numerical example, using eqn. 22: $r_0 = 1$, $f_0 = 1$, and volume $V_0/\pi = 1$. After loading to operative field magnitude ⅕, the magnitudes along c are $\Delta f = f_{op} + f_{n(dev)} = 2/5$, $r_c = |v_c| = 0.670$. Along e they are $f_{op} + f_{n(dev)} = 1/5 - 1/5 = 0$, $r_e = 1.000$; but $w_s = -2.036/5 = -0.407$, so $r_e = |v_e| = 1.503$. If S is the displacement field property tensor, $$r_c r_e = |v_c||v_e| = \det S = 1.0075 \qquad \text{(eqn. 47)}$$

indicating that in this example the volume expands by 0.75%.

Geometric Properties of Simple Shear Deformation

Figure 12:
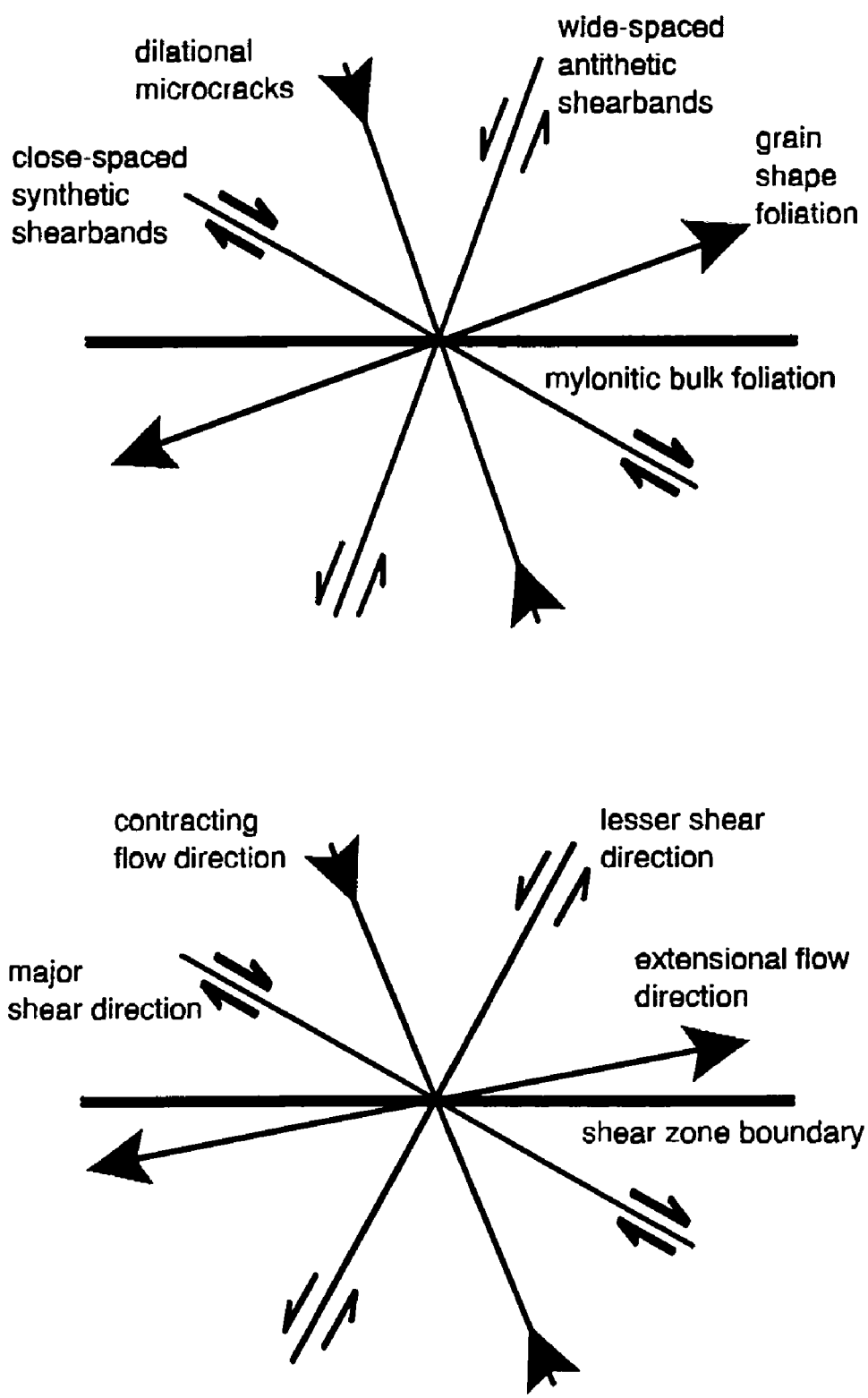
FIG. 12.

The coordinates $x_i$ are rotated with respect to $X_i$ by λ in the sense of shear. In physical space $X_i$, the following picture emerges (FIG. 12): the extending eigendirection e is at 10.71°, the contracting eigendirection c is at 111.63°. The bisectors of the angles enclosed by c and e are parallel to the $x_i$-coordinates and represent maximum shear directions. The orientation vector bisecting the large sector at 61.18° indicates a shear plane perpendicular to that orientation, the R-plane is therefore found at −28.83°; the orientation vector bisecting the small sector at −28.83° indicates the P-shear plane at 61.18° (FIG. 12).

The topic of this invention is the determination of the force field that causes the deformation, and the displacement field. But irrespective of the deformation mode—elastic or plastic—the displacement field must reflect the properties of the force field even if the resulting features may differ considerably in their nature. Therefore it is justified to correlate the properties of the calculated force field with fabric elements observed in plastically deformed rocks. $X_1$ is the shear zone boundary (FIG. 12a). Of the eigendirections, e is identified as the S-plane in S-C-fabrics (Berthé et al. 1979) and the plane parallel to which the main anisotropy of crystals is oriented. It is thus a stretch-only, no-rotation-no-shear direction. The predicted angle of ca. 11° compares favorably with the obliquity of fabric diagrams from monomineralic shear zones formed of minerals with only one major shear plane (ice, mica, olivine).

c is not well developed in high-temperature tectonites. It may be recognised through a lack of pressure shadows, or minimum mica alignment along the surface of feldspar porphyroclasts. However, if mylonites are exhumed they commonly develop joints that cut the layering at ca.70-80°, consistently inclined against the direction of shear. They appear to be controlled by the elastic energy stored during plastic deformation which is released when the confining pressure is no longer able to hold the rock together. This invention here predicts that dilational cracks should open parallel to c.

Figure 13A:
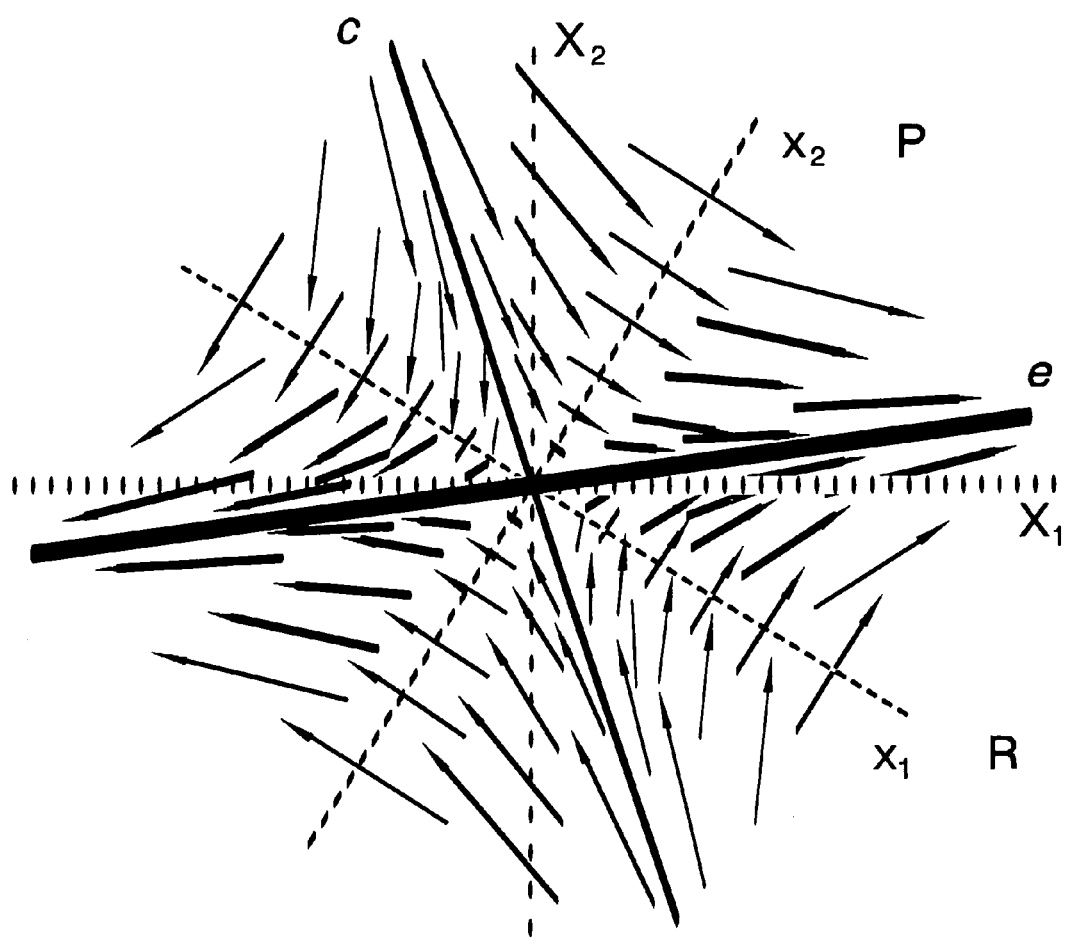
FIG. 13(a) Displacement field for simple shear. Although the external force field does not have a component perpendicular to $x_2$, such a component does exist in the effective field $f_{dev}$ and in the displacement field. (b) Natural SC-fabric: mylonite in lower greenschist facies, Insubric Line, Sesia Zone, Val Strona, Italy. Long dimension of picture is parallel to bulk foliation which serves as external reference frame. The shear planes inclined gently to the right are the C-planes. The layering dipping shallowly to the left is the S-plane. Considerable sinistral whole-body rotation between C-discontinuities which themselves have dextral sense of shear. Bulk sense of shear is dextral. (c) Viscous simple shear in subrecent obsidian flow, Lipari Island, Italy. Upper layer consisting of black glass with bubbles was softer and shows drag features. Lower layer consists of partly crystallized material and reacted brittle. Drag in upper layer and joint orientation in lower layer both indicate dextral bulk shear.
Figure 13B:
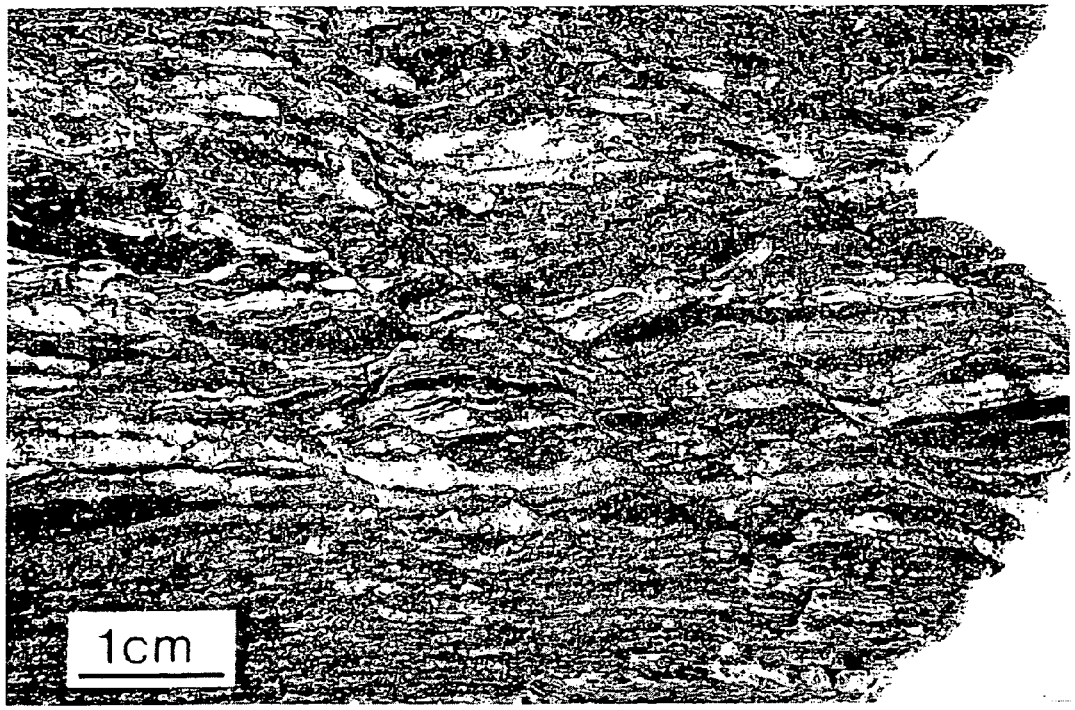
Figure 13C:
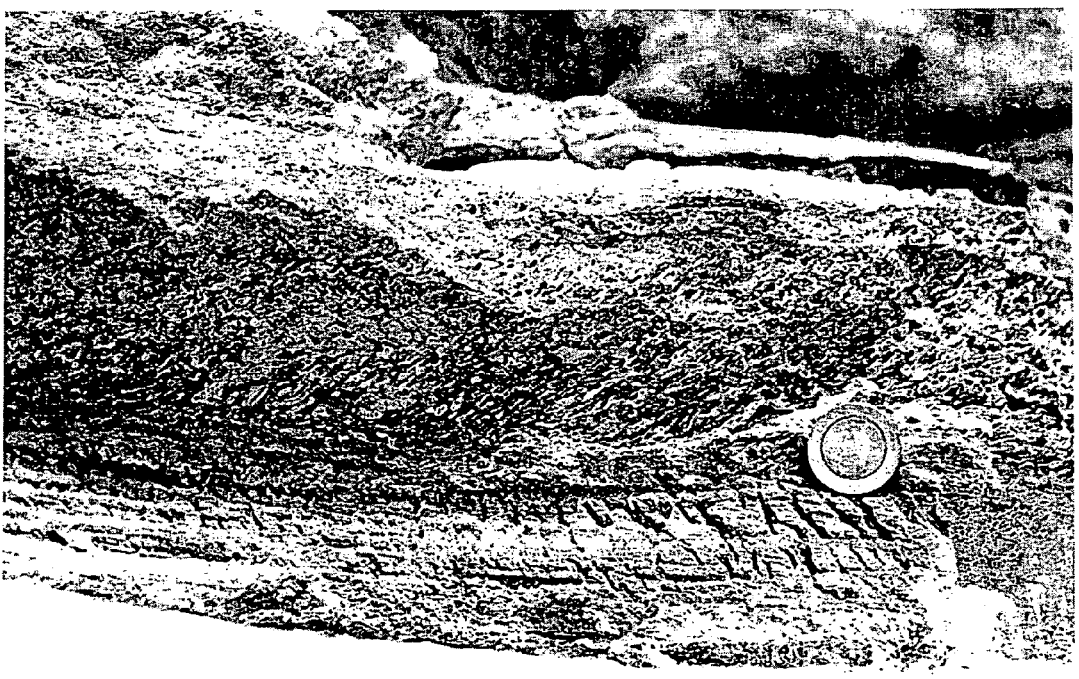

The shear plane at θ=−28.83° is the Riedel plane R (Riedel 1929) or the C-plane in S-C-fabrics (Berthé et al. 1979). The P-plane is usually suppressed in natural plastic deformation, but has been observed in shear box experiments (e.g., Merzer & Freund 1975), and is occasionally found as a minor shear direction (FIG. 12b). It is better developed if the rock behaviour was near the brittle-plastic transition zone. The synthetic R-plane (here dextral) and the antithetic P-plane (here sinistral) are not mechanically equivalent. The R-plane is expected to be the first to yield at the onset of plastic flow. FIG. 13 shows the flow field. The sense of shear on the R-plane is synthetic to the bulk sense of shear, but the R-plane also simultaneously rotates antithetically towards e; in the process it is progressively stretched until it decays. R- and P-planes are stretching faults in the sense of Means (1990).

Energetics of Elastic and Plastic, Pure and Simple Shear Deformation

Elastic Deformation

The state in which the system is, is controlled by the operative force field which serves as a measure of the field strength. It can be used to compare deformation types with one another. In the elastic mode, the operative and the deviatoric field are proportional to one another during loading; thus they both require work which represents the elastic potential. Since the sum of $f_{n(dev)}$ from 0 to π is zero, the work done by normal forces is only the work done by $f_{op}$, $$\int_0^{2\pi} f_{op} d\theta = -2\pi \qquad \text{(eqn. 48)}$$

for $r_0 = f_0 = \Delta f_{op} = 1$ (cf.eqn. 22). For an isotropic state, this would be the only term to be considered in 2D; in absolute numbers it turns out the be the maximum work for all states. This work will cause an isotropic contraction. Work done by shear forces will cause a directed dilation. Integrating eqn. 28 from 0 to π/2 for one quadrant, times 4 to account for all quadrants, yields 8.000; total work in elastic pure shear is therefore $w_{PS(el)} = 8 - 2\pi = 1.717$.

In elastic simple shear, the magnitude of $f_{op}$ is the same as above. The shear work term (eqn. 47) must be evaluated for one sector from c to e, and multiplied by 4 to account for all sectors. Total work in elastic simple shear is thus $w_{SS(el)} = -2\pi + 8.144 = 1.861$. At similar operative field strength, an elastic simple shear thus requires 8.4.% more energy than pure shear.

Plastic Deformation

The mechanism by which plastic deformation is achieved is not the subject of this invention; however, it is here assumed that the material remains continuous, and that a homogeneous state of the force field f is maintained. The transition from the elastic to the plastic deformation mode (the yield point) is marked by a change from reversible to irreversible behavior. Thus the operative field reaches a stable value requiring no more work.

All further work, the plastic deformation energy, is then work done by shear forces only. Since the dilation caused by them is also an elastic feature the buildup of which stops at the yield point, the energy is not stored in the volume of the system, but dissipated along its surface. Since the system therefore behaves passively, the double shear work concept (see discussion following eqn. 28) no longer applies, thus the required shear energy is only half the amount for elastic deformation. Dissipated energy is energy lost and need not be balanced; however, since no free whole-body rotations are possible in a field with real eigendirections—which are still required by the continuing existence of the elastically loaded state—the rotational momentum must still be balanced.

For pure shear, the sinistral and dextral shear integrated balance, thus no external rotation of the system is possible. In terms of work done, sinistral and dextral shear work add, thus the work done in plastic pure shear is half of the amount done in elastic loading, i.e. $w_{PS(pl)} = 4$.

For simple shear the affairs are a little more complex. Eqn. 45 integrated from the contracting to the extending eigendirection for both sectors yields differing magnitudes: 1.339 dextral shear-work in a large sector, and 0.733 sinistral shear work in a small sector. The imbalance for the entire system is 1.202, the total shear work done on the entire system is 4.144. Since the large sectors dominate, the imbalance is resolved into plastic dextral bulk shear. However, the resolution of the dextral imbalance leads to an imbalance in the angular momentum of the entire system. Since the shape of the system is elliptic and the long axis of the system is in the small sector with sinistral shear, the angular momentum of the system is proportional in magnitude, but opposite in sign to that of the resolved shear, i.e. sinistral. The dextral plastic shear work costs energy which is dissipated, i.e. it is an internal dextral rotation. The rotation of the system due to the angular momentum is an external sinistral rotation which is free. Since internal and external rotation cancel, the eigendirections are still real. Thus the energy dissipated due to a plastic dextral shear is minimized by an external sinistral rotation, and the energy thus saved is proportional to the imbalance; thus $w_{SS-pl} = 4.144 - 1.202 = 2.933$.

At similar operative field strength, a plastic simple shear thus requires 26.7% less energy than pure shear. Energetic differences of such a magnitude have been observed in experiments; they occurred systematically as a function of the displacement field, and independent of the experimental substance (quartz, salt, gypsum; Franssen & Spiers 1990; Franssen, pers. comm.).

The procedure presented here is completely compatible with the principles of potential theory and thermodynamics. The invention offers a straightforward, immediate correlation of force field to displacement field which are both vector fields controlled by tensors; from a mathematical point of view this is more systematic than the procedure used so far.

The new method also permits predictions which are not offered by the known procedure because the latter does not permit e.g. the deduction of a particular displacement field from a given stress state.

A viscous deformation step for a gas or fluid can be decomposed into a time-independent, reversible, elastic loading step and a time-dependent, irreversible, diffusion-controlled relaxation step. The new method is also suited for the modelling of viscous fluids as long as time spans are considered which are short in relation to the relaxation time.

An example for the modelling of an elastic deformation of a sample with given shape under given external boundary conditions.

The approach applied here is based on potential theory. The thermodynamic-continuum is not a continuum of points, but a continuum of systems. Any point Q in Euclidean space within a region of distributed mass can be thought to be the center of mass of a thermodynamic system; its physical properties—density, chemical composition, temperature, material properties, orientation of anisotropy—plus those of the external boundary conditions are then functions of Q. Scale independence ensures that the extensive properties are scaled per unit mass. Thus two infinitesimally close points $Q_1$ and $Q_2$ represent two different thermodynamic systems $V_1$ and $V_2$ of some finite unit size; they largely overlap, but their physical properties or boundary conditions may be subject to gradients in Euclidean space. The systems may be understood to have unit mass, unit volume, or unit radius which are all finite. In contrast to the known method, the invention presented here offers a finite distance which is based on its inherent logic— the radius of the thermodynamic system—which can be used as a base for a wave function. The spatial properties of the physical entities can thus be modelled through an application of Fourier series methods as a function of the external boundary conditions.

The total force field is partitioned into the isotropic operative force field $f_{op}$ and the deviatoric force field $f_{dev}$ (cf. Part I, Koenemann 2004b). The latter can again be decomposed into the normal component $f_{n(dev)}$ and the shear component $f_{s(dev)}$. Normal forces will shorten or stretch the radius vector on which they act, depending on sign; shear forces will always have a dilating effect; which amounts to an additional stretch component parallel to the extending eigendirection e. Following eqn. 28 (Koenemann 2000) it was stated that the work done by shear forces counts twice because one part of the stretch due to shear dilation in e is done by the system itself, the second part is done by the surrounding. The component originated by the system is purely a function of the loading configuration (loading intensity, external boundary conditions, e.g. pure shear). The shear dilation caused by the surrounding, however, surely exists in a perfect continuum, but its effect must reach zero at the interface to free space. If all other possible variables are kept constant it is this component that must vary as a function of location within a body, i.e. it is sensitive to the body shape and the specifics of the loading configuration.

The 2D-model consists of a rectangular body of solid. It is thought to be loaded on top and bottom with constant force whereas the lateral faces are free. The applied load is vertical, or parallel to y ($df_y/dx = 0$). The loaded faces (y=0, y=1) may not change length in x due to friction at the pistons; at all other y they are free. Thus the load is the same throughout the body, there is no gradient. This includes the points on the lateral faces. Consequently the magnitude of the operative field fop and the normal force field $f_{n(dev)}$ are monotonous throughout the body. They are not included in the model here.

Figure 14:
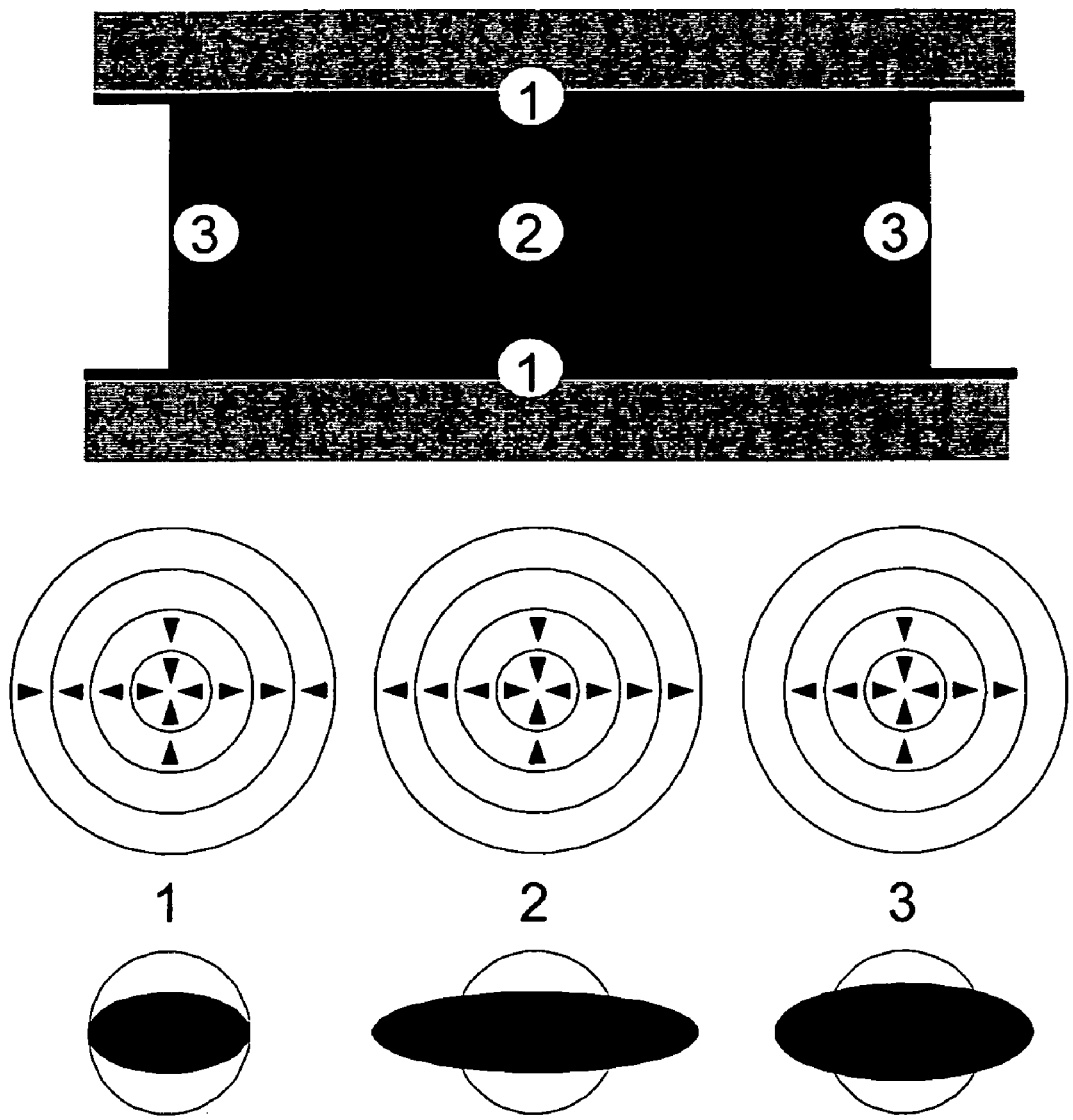
FIG. 14 Top: rectangular sample of solid between two anvils with the location of points for which the boundary conditions are shown below. Center: boundary conditions as a function of location within the body. Circles stand for (from inside out): operative field (isotropic); normal component of deviatoric field; shear dilatancy contributed by the system; volume effect due to external boundary conditions. The latter is directed inward in (1) due to the friction effect along the sample-anvil contact, in (2) it is directed outward due to the shear dilatancy effect contributed by the surrounding, and zero in (3) for points on the boundary between solid and freespace. Bottom: presentation of the expected effect; white circles: unloaded state, black ellipses: loaded state.
Figure 15:
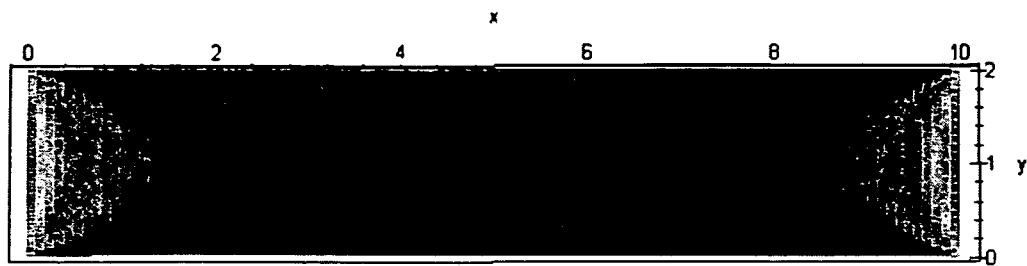
FIG. 15 Dimensions 10×2 unit distances. Wavy structure along the horizontal boundaries in lower panel are mathematical artefacts due to summation over non-infinite coefficients n.
Figure 15:
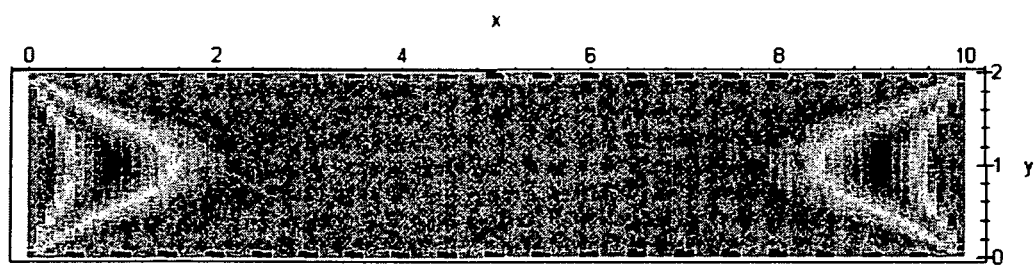
Figure 16:
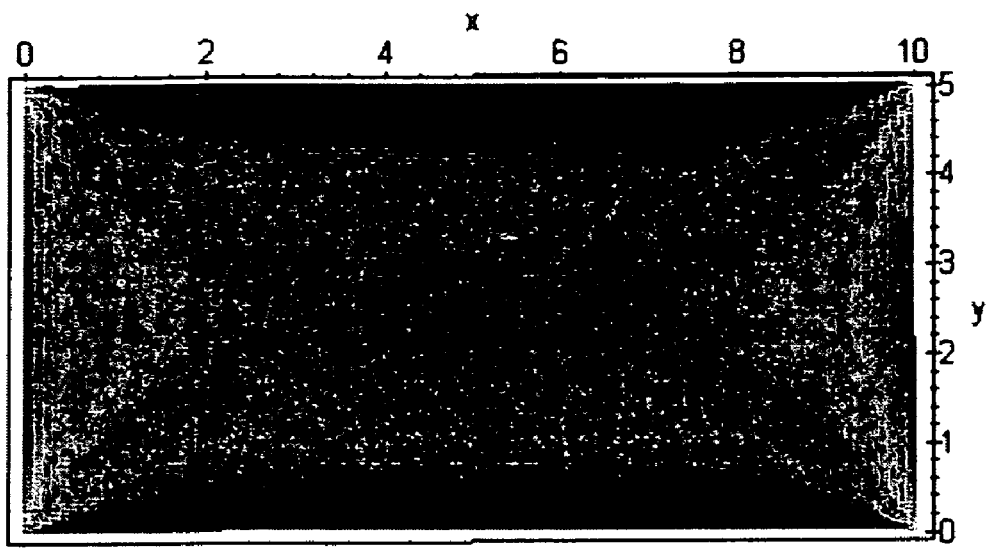
FIG. 16 Dimensions 10×5 unit distances. Wavy structure along the horizontal boundaries in lower panel are mathematical artefacts due to summation over non-infinite coefficients n.
Figure 16:
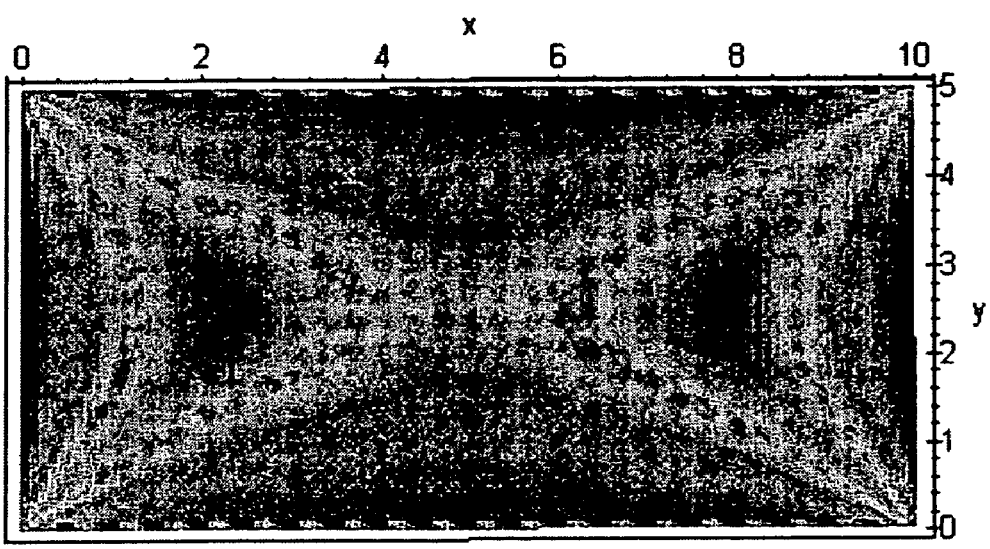
Figure 17:
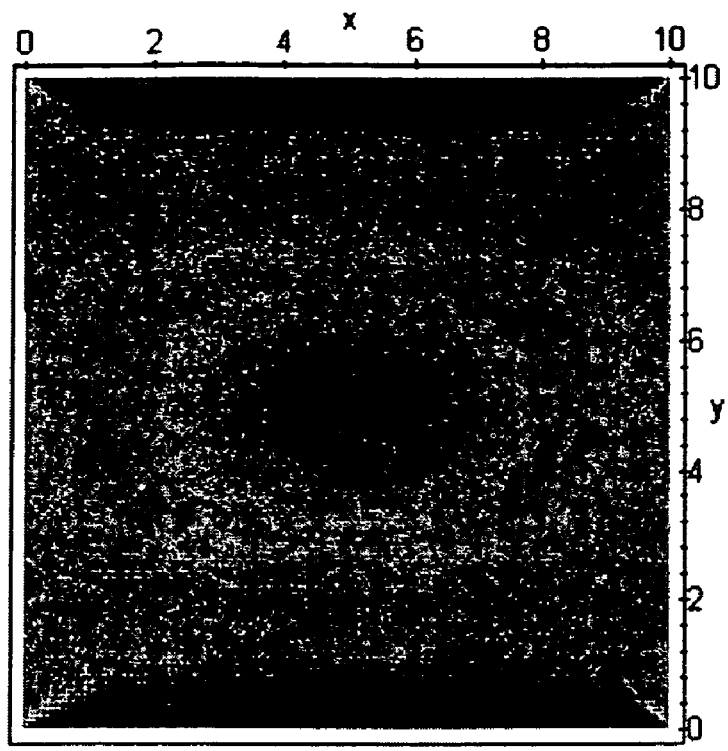
FIG. 17 Dimensions 10×10 unit distances.
Figure 17:
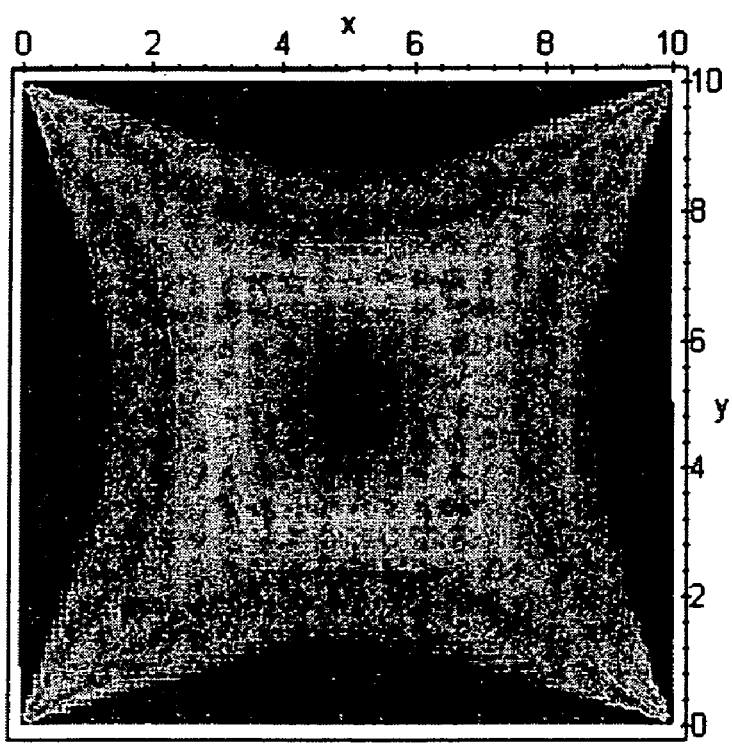
Figure 18:
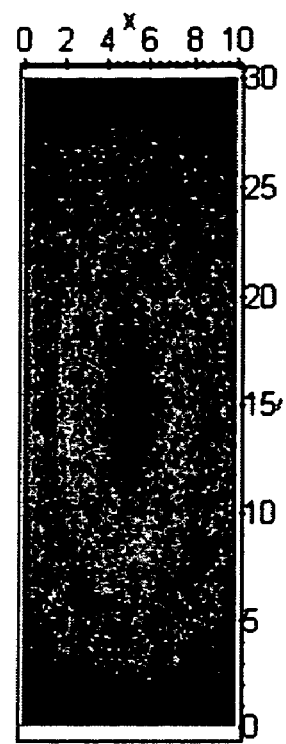
FIG. 18 Dimensions 10×30 unit distances.
Figure 18:
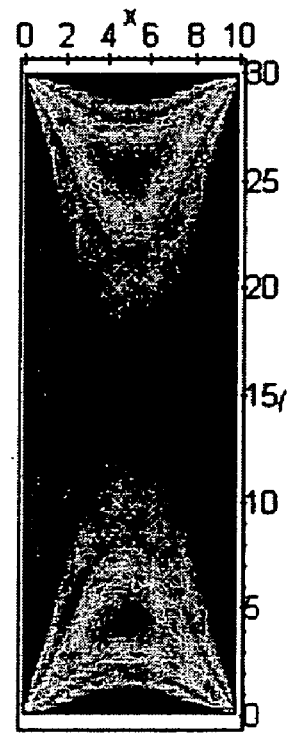

The boundary conditions for the dilational shear T vary over the body in a two-fold way: (a) the restriction of no change of length in x suppresses even the dilational effect produced by the system (system effect, $T_1$), it is strictest along the loaded faces y=0 and y=1, and relaxes towards the center of the solid, allowing for progressive expansion in x; and (b) the shear effect produced by the surrounding (surrounding effect, $T_2$) is fixed to a given minimum magnitude—on the free faces x=0 and x=1: because there is no bonded surrounding any more; on the loaded faces: because expansion in x is prevented by condition (a), but it increases towards the center. The direction of relaxation is towards the center for $T_1$, and towards the free margins for $T_2$. Thus the two boundary conditions are opposite in effect and sign (FIG. 14, arrows in fourth ring for conditions 1 and 2). They need to be modelled separately.

In the static loaded state system and surrounding do work on one another, but we cannot measure it; in thermodynamics only the work done in a change of state can be measured. No time-dependent processes are observed, system and surrounding are in equilibrium with one another, all fluxes are balanced. The quantity under investigation $T=T_1+T_2$ is the work done by shear forces, a scalar quantity, resulting in a volume change, also a scalar quantity. It is thus possible to approach the modelling of the static state through a Laplace equation.

$T_1$ will be dealt with first. The distribution of a scalar quantity $t_1$ over a region $x(0 \to b)y(0 \to d)$ with a maximum $t_1=M$ for all points y=0, and $t_1=0$ for all points x=0, x=b, and y=d is $$t_1 = -4M \sum_{n=1}^{\infty} \frac{\sinh\left(\frac{m\pi(d-y)}{b}\right)\sin\frac{m\pi x}{b}}{m\pi \sinh\frac{dm\pi}{b}} \qquad \text{(eqn. 49)}$$

(Boas 1983: 546, eqn. 2.17) where M is a magnitude scaling factor, b is the width of the solid along x, d is its length along y, and m=2n−1 (m is always odd). The reverse case is that of $t_2=M$ for all points y=d, and M=0 for all points x=0, x=b, and y=0, $$t_2 = -4M \sum_{n=1}^{\infty} \frac{\sinh\left(\frac{m\pi y}{b}\right)\sin\frac{m\pi x}{b}}{m\pi \sinh\frac{dm\pi}{b}} \qquad \text{(eqn. 50)}$$

The combined effect is $T_1=t_1+t_2$. Along x=b/2 $T_1$ forms an upward-warping curve with a minimum $T_1=-M$ for y=0 and y=d, and a maximum (M<0) for y=d/2. Along y=d/2 $T_1$ forms a downward-warping curve with a maximum $T_1=0$ for x=0 and x=b, and a minimum at y=d/2 (which is the maximum point on x=b/2).

For $T_2$ the boundary conditions are: M=0 for all points x=0, x=b, y=0, and y=d, and increasing towards the center. This is done through $$T_2 = b\sin\frac{\pi x}{b}d\sin\frac{\pi y}{d} \qquad \text{(eqn. 51)}$$

The sum $T=T_1+T_2$ is interpreted as the potential for dilational cracking (FIG. 15-18, upper panels). Of special interest is to find out were the gradients of T are the largest. Thus $$\frac{\partial T_1}{\partial x} = -4M \sum_{n=1}^{\infty} \frac{\left(\sinh\frac{m\pi(d-y)}{b} + \sinh\frac{m\pi y}{b}\right)\cos\left(\frac{m\pi x}{b}\right)}{b\sinh\frac{dm\pi}{b}} \qquad \text{(eqn. 52)}$$

and $$\frac{\partial T_2}{\partial x} = \pi\cos\frac{\pi x}{b}d\sin\frac{\pi y}{d}; \qquad \text{(eqn. 53)}$$

the magnitude of the gradient is given by $$\frac{\partial^2 T_1}{\partial x^2} = 4M \sum_{n=1}^{\infty} \frac{\left(\sinh\frac{m\pi(d-y)}{b} + \sinh\frac{m\pi y}{b}\right)m\pi\sin\frac{m\pi x}{b}}{b^2 \sinh\frac{dm\pi}{b}} \qquad \text{(eqn. 54)}$$

and $$\frac{\partial^2 T_2}{\partial x^2} = -\frac{\pi^2 \sin\frac{\pi x}{b}d\sin\frac{\pi y}{d}}{b} \qquad \text{(eqn. 55)}$$

The derivative $\partial^2 T/\partial x^2$ (the sum of eqns. 54 and 55) of the surface T(b,d) is interpreted as the potential for shear cracking (FIG. 15-18, lower panels). The derivative $\partial^2 T/\partial y^2$ gives identical results in the sense that the morphologies of both derivatives are identical, but their absolute magnitudes are a function of the chosen absolute dimensions of b and d, respectively. For realistic results the model needs to be rescaled to real material properties.

The method offers all properties of the loaded state as a function of location within the region of validity bd. In a similar way it should be possible to derive the displacement fields from the work equation and to calculate the shape of the deformed body.

Results

In FIGS. 15-18, the upper panels show the potential for dilational cracking T, the lower panels show the potential for shear cracking $\partial^2 T/\partial x^2$. The width of 10 distance units is the same in all figures. Colors indicate relative magnitudes (purple=minimum, red=maximum).

For thick, short columns (FIG. 15, height 2 units) the center is dynamically dead, it is under strong compression. The dilational crack potential is very close to the free surface, suggesting that a brittle material loaded to the elastic limit might spallate. The shear crack potential is farther inside the body, further destabilizing the surface, and low in the center. The failure-potential distribution is strongly controlled by the zero-glide boundary condition along the loaded faces.

If the height of the body is only slighty increased (FIG. 16, height 5 units), the dilational crack potential is still close to the surface, but the shear crack potential shifts very quickly into the interior of the body. The dilational and shear maxima no longer coincide.

In a body of square shape (FIG. 17, height 10 units) the dilational crack potential and the shear crack potential again coincide, but this time in the center of the body, suggesting that any material yield, brittle or plastic, should start there.

Turning to a long, slender column (FIG. 18, height 30 units) the dilational crack potential stays in the center of the body, but it extends along the long axis, decreasing only close to the loaded faces. The potential for shear cracking has left the center and shifted towards the loaded faces, it forms two maxima which peter out towards the center of the body, but they form sharp bifurcating extensions towards the corners of the body where the loaded and unloaded faces define a discontinuity in the boundary conditions. The two extensions and the loaded body surface form a triangular region: which is also under low dilational effect; this triangle is largely dead. The calculations permit the interpretation that brittle yielding should start through dilational cracking in the center of the body; the cracks should propagate along the long axis (which will ultimately change the boundary conditions to some degree) up to the region where the dilational potential abates; but here the shear potential reaches its maximum, so the mode of yield should switch from dilational to shear cracking and propagate towards the corners. The material response predicted here is indeed observed in experiments on brittle materials such as ceramics (Winter 1992).

CONCLUSIONS

It was shown that the new method for the determination of deformation can be modulated such that the physical properties of the loaded state in a discrete body subjected to a specific set of external boundary conditions can be calculated. In comparison to the known method the requirements on technical equipment and mathematical skill to achieve the results presented here are extremely modest. The calculations can be done on standard computers which are widely available.

The term "computer" is not to be understood in any way as limiting. It can be an arbitrary unit suited to conduct calculations, e.g. work stations, personal computers, microcomputers, or a switch designed to conduct calculations.

It is a substantial advantage of the method presented here that a grid of pre-defined points is not necessary; instead, a solution can readily be found for any point within the region of validity, using mathematical methods for which solutions for problems in other field theories are known for a long time.

It is of special advantage of this invention to determine deformations without a grid of nodes (cf. FIG. 01).

The invention thus offers a substantial simplification for the determination of deformations.

LITERATURE

Berthé, D., Choukroune, P., Jegouzo, P. (1979) *Orthogneiss, mylonite and non-coaxial deformation of granites: the example of the South Armorican Shear Zone*. Journal of Structural Geology 1, 31-41

Boas, M. L. (1983) *Mathematical methods in the physical sciences*. J. Wiley & Sons, 2nd ed., 793 pp Bridgman, P. W. (1958) *The physics of high pressure*. Bell & Sons Ltd, London; 445 pp.

Franssen, R. C. M. W., Spiers, C. J. (1990) *Deformation of polycrystalline salt in compression and in shear at 250-350° C*. In: Knipe, R. (ed.) *Deformation mechanisms, rheology and tectonics*. Geological Society of London Special Paper 54, 201-213

Jeanloz, R., Knittle, E. (1986) *Reduction of mantle and core properties to a standard state by adiabatic decompression*. In: Saxena, S. (ed.) *Chemistry and physics of terrestrial planets*. Springer Verlag, 275-309.

Kellogg, O. D. (1929) *Foundations of potential theory*. Springer Verlag, 384 pp.

Malvem, L. E. (1969) *Introduction to the mechanics of a continuous medium*. Prentice-Hall, 713 pp.

Merzer, A. M., Freund, R. (1975) *Buckling of strike slip faults—in model and in nature*. Geophysical Journal of the Royal Astronomical Society 43, 517-530

Riedel, W. (1929) *Zur Mechanik geologischer Brucherscheinungen*. Centralblatt für Mineralogie, Abt.B, 1929, 354-368

The invention claimed is:

1. A method employing a computer for predicting a deformation in a body, comprising the steps of:
    defining, using the computer, a system within the body and surroundings within the body about the system;
    specifying, using the computer, a sum of external forces ($f_{ext}$) exerted on the system by the surroundings;
    specifying, using the computer, a sum of system forces ($m_{syst}$) exerted by the system on the surroundings;
    specifying, using the computer, material properties of the system;
    specifying, using the computer, boundary conditions acting at the interface between the system and the surroundings;
    predicting, using the computer, the deformation of the body according to the formula:

$$f_{ext} + m_{syst} + m_A + f_{s(ext)} + m_{s(syst)} = 0;$$

wherein: $m_A$ represents surface-bonding constraining forces, $f_{s(ext)}$ represents the shear component of $f_{ext}$, and $m_{s(syst)}$ represents the shear component of $m_{syst}$; and
    displaying, using the computer, the deformation of the body.

2. The method of claim 1, further comprising specifying, using the computer, the geometry of the system without using a plurality of nodes defining a grid.

3. The method of claim 1, wherein the material properties vary as a function of location within the body.

4. The method of claim 1, wherein the step of predicting the deformation comprises computing, using the computer, a crack potential as a function of location within the body to identify regions within the body susceptible to deformation.

5. The method of claim 1, wherein the step of predicting the deformation comprises computing, using the computer, radial elongations and/or radial contractions within the body to identify volumetric deformation.

6. The method of claim 1, wherein the step of displaying the deformation of the body comprises displaying, using the computer, the deformation of the body in two dimensions.

7. The method of claim 6, wherein the step of displaying in two-dimensions comprises displaying, using the computer, the deformation of the body using different colors, the different colors indicating relative magnitudes of the deformation of the body.

* * * * *